US012758448B2

(12) United States Patent
Bolduc et al.

(10) Patent No.: US 12,758,448 B2
(45) Date of Patent: Oct. 13, 2026

(54) PATIENT SUPPORT HAVING AN INFLATABLE BLADDER

(71) Applicant: UMANO MEDICAL INC., L'Islet (CA)

(72) Inventors: Steve Bolduc, Beaumont (CA); Simon Dubé, Levis (CA); Philippe Boutin, Levis (CA); Joanie Frongillo Guay, Quebec (CA); Frédéric Renaud, Levis (CA)

(73) Assignee: UMANO MEDICAL INC., L'Islet (CA)

( * ) Notice: Subject to any disclaimer, the term of this patent is extended or adjusted under 35 U.S.C. 154(b) by 0 days.

(21) Appl. No.: 19/119,125

(22) PCT Filed: Oct. 26, 2023

(86) PCT No.: PCT/IB2023/060805
§ 371 (c)(1),
(2) Date: Apr. 8, 2025

(87) PCT Pub. No.: WO2024/089637
PCT Pub. Date: May 2, 2024

(65) Prior Publication Data

US 2026/0124088 A1 May 7, 2026

Related U.S. Application Data

(60) Provisional application No. 63/420,255, filed on Oct. 28, 2022.

(51) Int. Cl.
*A61G 7/057* (2006.01)
*A61G 7/07* (2006.01)

(52) U.S. Cl.
CPC ..... *A61G 7/05769* (2013.01); *A61G 7/05784* (2016.11); *A61G 7/07* (2013.01); *A61G 2203/34* (2013.01)

(58) Field of Classification Search
CPC ...... A47C 27/081–083; A61G 7/05769; A61G 7/05784; A61G 7/05792
See application file for complete search history.

(56) References Cited

U.S. PATENT DOCUMENTS 5,699,570 A 12/1997 Wilkinson et al.
6,223,369 B1 5/2001 Maier et al.
(Continued)

FOREIGN PATENT DOCUMENTS

WO WO-9111617 A1 * 8/1991 ............ A47C 27/10

*Primary Examiner* — Eric J Kurilla
(74) *Attorney, Agent, or Firm* — Juan Carlos Ramos Perfecto; Isabelle Chabot

(57) ABSTRACT

A patient support includes: a resilient support layer for supporting a patient, the resilient support layer having an upper surface and a lower surface opposite the upper surface, the upper surface being configured to, in use, face toward the patient supported by the resilient support layer; and an inflatable bladder disposed underneath at least part of the lower surface of the resilient support layer such that, in use, the resilient support layer is disposed between the patient and the inflatable bladder, the inflatable bladder being configured to be fluidly connected to a pump in order to be selectively inflated by the pump and thereby limit an immersion of the patient into the resilient support layer. A method for controlling a patient support is also disclosed.

19 Claims, 14 Drawing Sheets

(56) References Cited

U.S. PATENT DOCUMENTS

| | | | | |
|---|---|---|---|---|
| 6,848,138 | B1 | 2/2005 | Maier et al. | |
| 7,296,314 | B2 | 11/2007 | Wyatt et al. | |
| 7,685,664 | B2 | 3/2010 | Stolpmann et al. | |
| 7,886,386 | B2 | 2/2011 | Balonick et al. | |
| 9,717,638 | B2 | 8/2017 | O'Reagan | |
| 9,814,642 | B2 | 11/2017 | Purdy et al. | |
| 11,129,482 | B2 | 9/2021 | Borgman et al. | |
| 2005/0273940 | A1 | 12/2005 | Petrosenko et al. | |
| 2007/0235036 | A1 | 10/2007 | Bobey et al. | |
| 2008/0028533 | A1 | 2/2008 | Stacy | |
| 2008/0028534 | A1* | 2/2008 | Wilkinson | A61G 7/05769 5/713 |
| 2008/0189865 | A1 | 8/2008 | Bhai | |
| 2009/0106898 | A1* | 4/2009 | Flick | A61G 7/05784 5/713 |
| 2009/0144909 | A1 | 6/2009 | Skinner et al. | |
| 2009/0237264 | A1 | 9/2009 | Bobey | |
| 2010/0281618 | A1 | 11/2010 | O'Reagan | |
| 2011/0209289 | A1 | 9/2011 | Meyer et al. | |
| 2019/0000700 | A1 | 1/2019 | Daniels et al. | |
| 2019/0262201 | A1* | 8/2019 | Borgman | G01T 1/16 |

* cited by examiner

PATIENT SUPPORT HAVING AN INFLATABLE BLADDER

CROSS-REFERENCE

The present application is a national stage entry application under 35 U.S.C. § 371 of International Patent Application No. PCT/IB2023/060805 filed on Oct. 26, 2023, which claims priority from U.S. Provisional Patent Application No. 63/420,255, filed on Oct. 28, 2022, both of which are incorporated by reference herein.

FIELD OF TECHNOLOGY

The present technology relates to patient supports such as mattresses.

BACKGROUND

Patient supports, namely mattresses, are designed to comfortably support a patient lying thereon. Notably, patient supports are particularly useful in cases where patients have limited mobility as patient supports are specifically designed to minimize localized pressure on a patient's body to avoid the patient developing pressure ulcers (i.e., bedsores) from lying on the patient support for an extended period of time without moving. To that end, a patient support can be designed to have a significant amount of resilience such that, when the patient lies on the patient support, the patient's body is immersed into the patient support resulting in a distribution of the weight of the patient on a larger surface area, thereby reducing localized contact pressure along the patient's body.

However, while the immersion of the patient's body in the patient support is desirable, it may in some cases complicate other operations. In particular, the egress of the patient from the patient support and moving the patient from one position to another on the patient support could be more difficult as the patient's body sits deep within the material of the patient support. Moreover, in some cases, certain treatments typically provided by a medical professional or a caregiver while the patient is lying on the patient support may be rendered more difficult by the immersion of the patient's body into the patient support.

In view of the foregoing, there is a need for a patient support that addresses at least some of these drawbacks.

SUMMARY

It is an object of the present technology to ameliorate at least some of the inconveniences present in the prior art.

According to an aspect of the present technology, there is provided a patient support comprising: a resilient support layer for supporting a patient, the resilient support layer having an upper surface and a lower surface opposite the upper surface, the upper surface being configured to, in use, face toward the patient supported by the resilient support layer; and an inflatable bladder disposed underneath at least part of the lower surface of the resilient support layer such that, in use, the resilient support layer is disposed between the patient and the inflatable bladder, the inflatable bladder being configured to be fluidly connected to a pump in order to be selectively inflated by the pump and thereby limit an immersion of the patient into the resilient support layer.

In some embodiments, the inflatable bladder comprises a plurality of elongated cells that are in fluid communication with each other; and each elongated cell of the plurality of elongated cells is elongated in a transverse direction of the patient support.

In some embodiments, the resilient support layer comprises: a central portion made of a first resilient material; and a left portion and a right portion disposed on a left side and a right side of the central portion respectively, the left and right portions being made of a second resilient material, the second resilient material having a greater rigidity than the first resilient material, the inflatable bladder being disposed underneath the central portion of the resilient support layer.

In some embodiments, the resilient support layer is not inflatable.

In some embodiments, the resilient support layer is made of foam.

In some embodiments, the inflatable bladder is positioned such that, in use, the inflatable bladder is aligned, in a longitudinal direction of the patient support, with a back and/or a pelvic region of the patient.

In some embodiments, the inflatable bladder defines a plurality of relief apertures for allowing fluid to flow out of the inflatable bladder.

In some embodiments, the patient support further comprises a top moisture permeable layer disposed at least partially above the resilient support layer.

In some embodiments, the patient support further comprises a bottom layer removably connected to the top moisture permeable layer for enclosing the resilient support layer and the inflatable bladder therebetween.

In some embodiments, the inflatable bladder is disposed between the resilient support layer and the bottom layer.

In some embodiments, the patient support further comprises: an air diffusion layer for diffusing air; and an air distribution manifold fluidly connected to the air diffusion layer, the air distribution manifold being configured to be fluidly connected to the pump in order to distribute air to the air diffusion layer.

In some embodiments, a patient support system comprises: the patient support; a pump in fluid communication with the inflatable bladder; and a controller in communication with the pump, the controller being operable to selectively activate the pump to inflate the inflatable bladder and thereby limit the immersion of the patient into the resilient support layer.

In some embodiments, the patient support system further comprises a pressure sensor in communication with the controller and configured to sense a pressure within a pneumatic system formed in part by the pump and the inflatable bladder; and the controller is configured to deactivate the pump in response to the pressure in the pneumatic system being greater than a predetermined threshold pressure.

In some embodiments, the predetermined threshold pressure is equal to or greater than 3 psi.

In some embodiments, the controller is configured to deactivate the pump in response to a pressurization time associated with the inflatable bladder being equal to or greater than a threshold pressurization time.

In some embodiments, the threshold pressurization time is between 10 and 30 minutes inclusively.

In some embodiments, the patient support system further comprises a pressure sensor in communication with the controller and configured to sense a pressure within a pneumatic system formed in part by the pump and the inflatable bladder; and the controller begins counting the pressurization time in response to the pressure sensed by the pressure sensor being greater than a predetermined inflation pressure that is indicative of the inflatable bladder being at a desired inflation level.

In some embodiments, the patient support system further comprises a check valve in fluid communication with the inflatable bladder, the check valve being configured to open at a cracking pressure in order to limit pressure within the inflatable bladder.

In some embodiments, the cracking pressure of the check valve is less than 3 psi.

In some embodiments, the patient support system further comprises a flow control valve in fluid communication with the inflatable bladder, the flow control valve being configured to allow air flow therethrough from the inflatable bladder in response to air flow to the inflatable bladder being interrupted.

In some embodiments, the patient support further comprises: an air diffusion layer disposed above the resilient support layer; and an air distribution manifold having at least one air distribution conduit for distributing air to the air diffusion layer, and the check valve and the flow control valve are operatively connected to the air distribution manifold and are configured to discharge air to the air distribution manifold.

In some embodiments, the patient support further comprises: an air diffusion layer for diffusing air; and an air distribution manifold fluidly connected to the air diffusion layer, the air distribution manifold being fluidly connected to the pump in order to distribute air to the air diffusion layer; the patient support system further comprises a mode selection valve fluidly connected to the pump for selectively routing air to the inflatable bladder and to the air distribution manifold, wherein: the mode selection valve is movable between a first position and a second position; in the first position, the mode selection valve fluidly connects the pump to the air distribution manifold to distribute air to the air diffusion layer; and in the second position, the mode selection valve fluidly connects the pump to the inflatable bladder to inflate the inflatable bladder.

In some embodiments, the mode selection valve is a mechanical two-position valve that is movable by a user between the first position and the second position.

In some embodiments, the mode selection valve is a mechanical two-position valve that is movable by a user from the first position to the second position; the mode selection valve is maintained in the second position in response to a pressure at a pilot port of the mode selection valve being equal to or greater than a predetermined pressure; and the mode selection valve is movable from the second position to the first position in response to the pressure at the pilot port decreasing below the predetermined pressure.

In some embodiments, the pilot port is an internal pilot port.

In some embodiments, the mode selection valve is a pneumatic timer; the pneumatic timer is actuated by a user to move the pneumatic timer from the first position to the second position for a set delay time; the pneumatic timer is biased to the first position such that, in response to the set delay time expiring, the pneumatic timer is moved to the first position.

In some embodiments, the mode selection valve is a solenoid valve; and the controller is in communication with the mode selection valve to actuate the mode selection valve between the first and second positions.

In some embodiments, the mode selection valve is a two-way two-position solenoid valve.

In some embodiments, the mode selection valve is a magnetic latching solenoid valve.

In some embodiments, the mode selection valve comprises: a valve compartment defining a first outlet port for supplying air to the air distribution manifold and a second outlet port for supplying air to the inflatable bladder; and a movable valve assembly for selectively closing and opening one of the first outlet port and the second outlet port.

In some embodiments, in the first position of the mode selection valve, the movable valve assembly opens the first outlet port to allow air flow therethrough; and in the second position of the mode selection valve, the movable valve assembly closes the first outlet port to impede air flow therethrough.

In some embodiments, the movable valve assembly comprises a retractable plunger and a suction cup fixed to an end of the plunger, the suction cup being shaped and sized to seal the first outlet port in the first position of the movable valve assembly.

In some embodiments, the patient support system further comprises a first check valve disposed between the inflatable bladder and the pump for impeding air flow into the inflatable bladder, the check valve being a spring-loaded check valve having a cracking pressure that is less than an operating pressure of the inflatable bladder.

In some embodiments, the patient support system further comprises a free-floating check valve disposed between the inflatable bladder and the pump, wherein: the first check valve is disposed along a first pneumatic passage extending between the inflatable bladder and the pump, the second check valve is disposed along a second pneumatic passage extending between the inflatable bladder and the pump; and the first and second pneumatic passages extend parallel to each other.

In some embodiments, the patient support system further comprises a position sensor in communication with the controller, the position sensor being configured to transmit a signal to the controller indicative of a position of the patient support, the controller selectively activating the pump to inflate the inflatable bladder based at least in part on the signal received from the position sensor.

According to another aspect of the present technology, there is provided a patient support system comprising: patient support comprising: a resilient support layer for supporting a patient; and an inflatable bladder disposed underneath at least part of the resilient support layer; and an air supply module exterior to the patient support and operatively connected to the patient support, the air supply module comprising: a pump operable to selectively inflate the inflatable bladder to limit immersion of a patient into the resilient support layer; a user-actuated control for selectively activating a bladder inflation mode in which the inflatable bladder is inflated to limit an immersion of a patient into the resilient support layer; and a controller in communication with the pump, the controller being responsive to a user input at the user-actuated control.

In some embodiments, the air supply module further comprises a housing enclosing the pump and the controller therein.

According to another aspect of the present technology, there is provided a method for controlling a patient support, the patient support comprising a resilient support layer for supporting a patient and an inflatable bladder disposed underneath the resilient support layer, the method comprising: receiving an activation signal indicative of a user's desire to activate a bladder inflation mode; and in response to receiving the activation signal, inflating the inflatable bladder to limit an immersion of the patient into the resilient support layer.

In some embodiments, the method further comprises: sensing a pressure associated with a pneumatic system formed in part by a pump and the inflatable bladder; and stopping inflation of the inflatable bladder upon the pressure associated with the pneumatic system reaching an operating pressure of the inflatable bladder.

In some embodiments, the method further comprises, after stopping inflation of the inflatable bladder, selectively inflating the inflatable bladder in response to the pressure associated with the pneumatic system decreasing below the operating pressure of the inflatable bladder.

In some embodiments, the method further comprises: counting a pressurization time associated with the inflatable bladder; and in response to the pressurization time associated with the inflatable bladder reaching a threshold pressurization time, deactivating the bladder inflation mode to allow the inflatable bladder to deflate and stop limiting the immersion of the patient into the resilient support layer.

In some embodiments, said counting the pressurization time begins in response to the pressure associated with the pneumatic system reaching the operating pressure of the inflatable bladder.

According to another aspect of the present technology, there is provided an air supply module for controlling a patient support, the patient support comprising a first fluid-receiving component and a second fluid-receiving component, the air supply module comprising: a pump for providing fluid flow to the first and second fluid-receiving components; and a solenoid valve movable between a first position in which fluid flow from the pump is directed to the first fluid-receiving component, and a second position in which fluid flow from the pump is directed to the second fluid-receiving component, the solenoid valve comprising a movable valve assembly for selectively closing and opening an outlet port defined by a housing of the solenoid valve, the movable valve assembly comprising a retractable plunger and a suction cup fixed to an end of the plunger, the suction cup being sized and shaped to seal the outlet port in the first position of the solenoid valve.

In some embodiments, the solenoid valve is a magnetic latching solenoid valve.

In some embodiments, the solenoid valve is a two-way two-position valve.

Embodiments of the present technology each have at least one of the above-mentioned objects and/or aspects, but do not necessarily have all of them. It should be understood that some aspects of the present technology that have resulted from attempting to attain the above-mentioned objects may not satisfy these objects and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
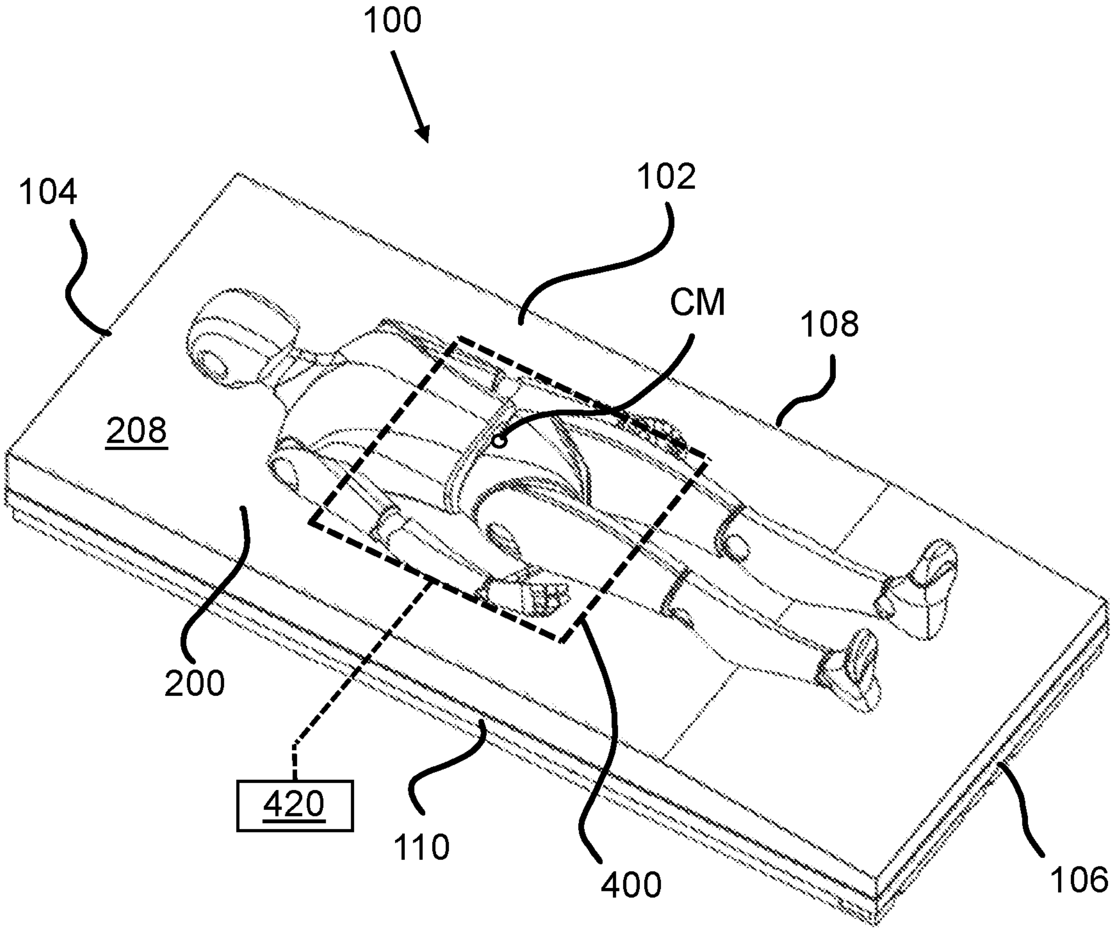
FIG. 1 is a perspective view, taken from a top, right side, of a patient support system according to an embodiment of the present technology, shown with a patient lying on a patient support of the patient support system.

A patient support system 100 in accordance with an embodiment of the present technology is illustrated in FIG. 1. The patient support system 100 includes a patient support 102, namely a mattress, which can in some cases be used in conjunction with a bed (e.g., a hospital bed). Notably, the patient support 102 may be used in a medical setting to comfortably support a patient thereon (as illustrated in FIG. 1). As will be described in more detail below, in accordance with the present technology, the patient support 102 includes an inflatable bladder 400, shown schematically in FIG. 1, that can be selectively inflated to temporarily rigidify a portion of the patient support 102 on which the patient is lying. This may facilitate the patient's egress from the patient support 102, namely by countering an immersion of the patient into the patient support 102.

With reference to FIG. 1, the patient support 102 has a head end 104 and a foot end 106 opposite each other and defining a length of the patient support 102 therebetween. As will be appreciated, in use, when the patient is lying on the patient support 102, the patient's head is closer to the head end 104 while the patient's feet are closer to the foot end 106. The patient support 102 also has a left end 108 and a right end 110 which define a transverse dimension (i.e., a width) of the patient support 102 therebetween.

Figure 2:
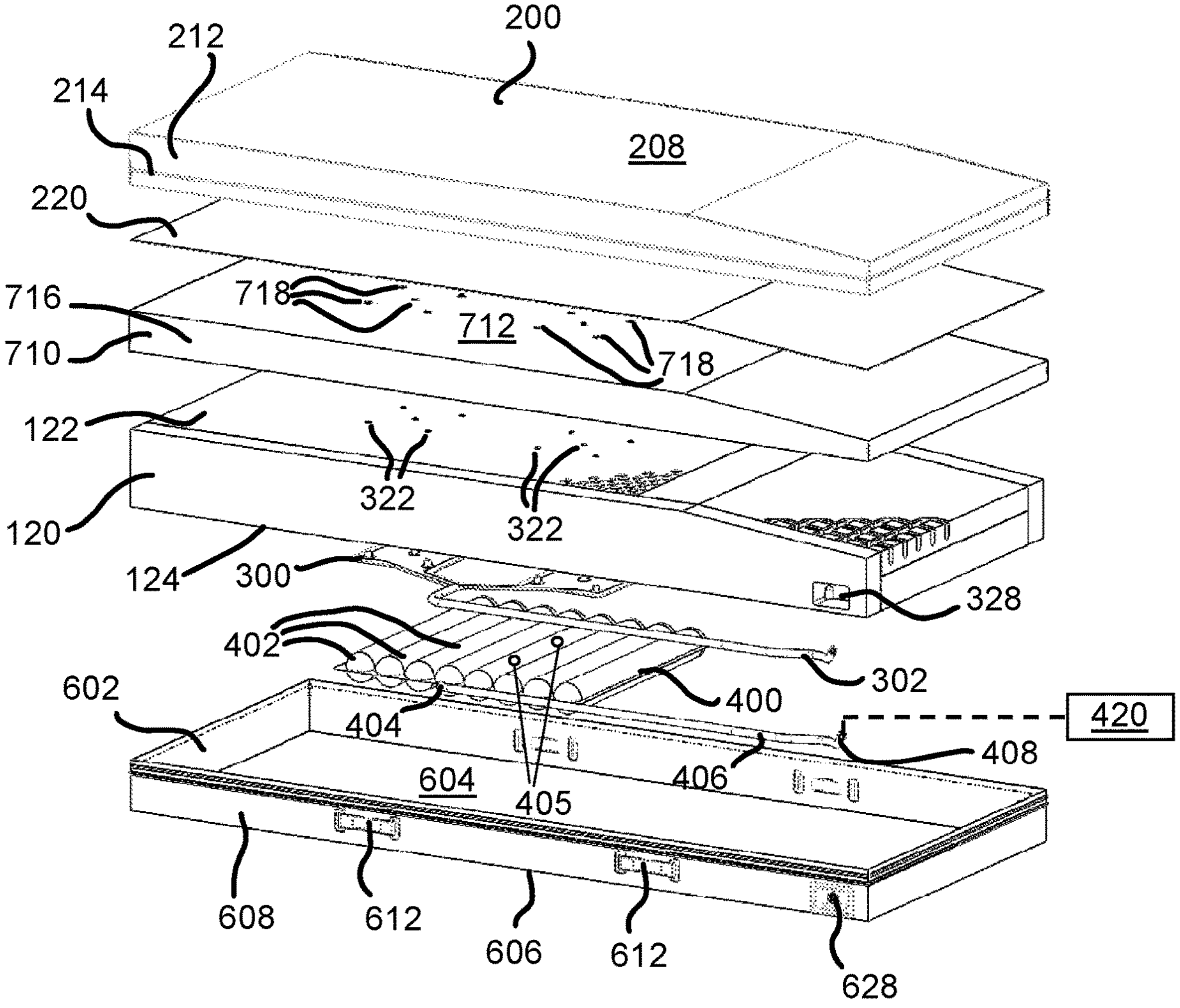
FIG. 2 is an exploded view, taken from a top, right side, of the patient support of FIG. 1.

As shown in FIG. 2, the patient support 102 has a resilient support layer 120 that is configured to support the patient. The resilient support layer 120 has an upper surface 122 which, in use, faces upwardly toward the patient lying on the patient support 102, and a lower surface 124 opposite the upper surface 122. The resilient support layer 120 is designed to be resilient such that, when the patient lies on the patient support 102, the resilient support layer 120 deforms under the weight of the patient and conforms to the shape of the patient's body, effectively enveloping part of the patient's body. This immersion of the patient's body into the resilient support layer 120 allows a distribution of the patient's weight over a greater surface area, thereby contributing to the comfort of the patient and minimizing the risk of developing pressure ulcers (e.g., for a patient with limited mobility or a patient confined to a bed for a long duration for any given reason).

In this embodiment, the resilient support layer 120 is made of one or more resilient materials. More specifically, in this example, the resilient support layer 120 is formed from multiple distinct pieces having different rigidities. For instance, in this embodiment, the resilient support layer 120 has a central portion 126 that has a different rigidity from left and right portions 128, 130 of the resilient support layer 120 disposed on the left and right sides of the central portion 126 respectively. In particular, the resilient material of the left and right portions 128, 130 has a greater rigidity than the resilient material of the central portion 126. In this example, each of the central portion 126 and the left and right portions 128, 130 extends along an entirety of the length of the resilient support layer 120. The central portion 126 is spaced from the left and right ends 108, 110 of the patient support 102 by the left and right portions 128, 130. It is contemplated that additional portions of the resilient support layer 120 could have different rigidities (e.g., a foot portion having a different rigidity).

In this embodiment, the resilient support layer 120 is made of foam. The central portion 126 and the left and right portions 128, 130 are thus made from foams having different rigidities. The difference in rigidities between the central portion 126 and the left and right portions 128, 130 may facilitate the patient's immersion into the foam of the central portion 126 while providing more rigid lateral zones which can facilitate the patient's egress from the patient support 102 and minimize the risk of falling off the patient support 102. Therefore, as will be appreciated, in this embodiment, the resilient support layer 120 is not inflatable. That is, the resilient support layer 120 does not comprise inflatable chambers that are fed by a pump.

It is contemplated that, in other embodiments, the resilient support layer 120 could be made of a different type of resilient material and/or could have a different construction that imparts resilience to the resilient support layer 120. For instance, in some embodiments, the resilient support layer 120 could be made of one or more air-filled pockets.

Returning to FIGS. 2 and 3, in this embodiment, the patient support 102 also includes a top moisture permeable layer 200 disposed above the resilient support layer 120. The top moisture permeable layer 200 may also be referred to as a "top cover" of the patient support 102. The top moisture permeable layer 200 has an upper surface 208, an opposed lower surface 210, and a peripheral wall 212 extending downwardly from the upper surface 208 and the lower surface 210 along the peripheries thereof. The upper surface 208 and the lower surface 210 of the top moisture permeable layer 200 overlie the upper surface 122 of the resilient support layer 120, while the peripheral wall 212 extends along the periphery of the resilient support layer 120.

In this embodiment, the top moisture permeable layer 200 is made of a material having a moisture vapor transmission rate (MVTR) that enables humidity and moisture from the patient lying on the patient support 102 to permeate therethrough, into an intermediate air diffusion layer 220 disposed below, to regulate the microclimate environment around and/or below the patient. Exemplary MVTR varying between about 50 to 600 g/m$^2$/24 hrs (ASTM E96 upright) may be selected. The top moisture permeable layer 200 may also be made of a four-way or a two-way stretchable material to minimize shear forces in the contact areas between the occupant and the top moisture permeable layer 200 in order to improve comfort to the occupant. Exemplary materials for the top moisture permeable layer 200 include polyurethane transfer coating on warp knitted polyester fabric or polyurethane transfer coating on weft knitted polyamide fabric as non-limitative examples.

In this embodiment, the patient support 102 also includes a bottom layer 602 disposed in part below the resilient support layer 120. The bottom layer 602 may also be referred to as a "bottom cover" of the patient support 102. The bottom layer 602 and the top moisture permeable layer 200 together form a compartment for enclosing therein the internal components of the patient support 102, notably including the resilient support layer 120 and the inflatable bladder 400. In some embodiments, the bottom layer 602 is made of a fluid-resistant material. The bottom layer 602 has an upper surface 604, an opposed lower surface 606, and a peripheral wall 608 extending upwardly from the upper and lower surfaces 604, 606. The upper and lower surfaces 604, 606 are aligned, longitudinally and transversely, with the lower surface 124 of the resilient support layer 120, while the peripheral wall 608 extends along the periphery of the resilient support layer 120. In this example, handles 612 are provided along the peripheral wall 608, namely on the left and right sides of the bottom layer 602.

In this embodiment, the bottom layer 602 is attachable to the top moisture permeable layer 200. Notably, the bottom layer 602 has an attachment element 612 extending at least partially along the peripheral wall 608. The attachment element 612 cooperates with a corresponding attachment element 214 of the top moisture permeable layer 200 such that the bottom layer 602 is at least partially detachable from the top moisture permeable layer 200. The attachment elements 214, 612 may be airtight or non-airtight according to specific applications of the patient support 102. Exemplary attachment elements 214, 612 may include a zipper, an elastic band, buttons or attachment straps.

Figure 3:
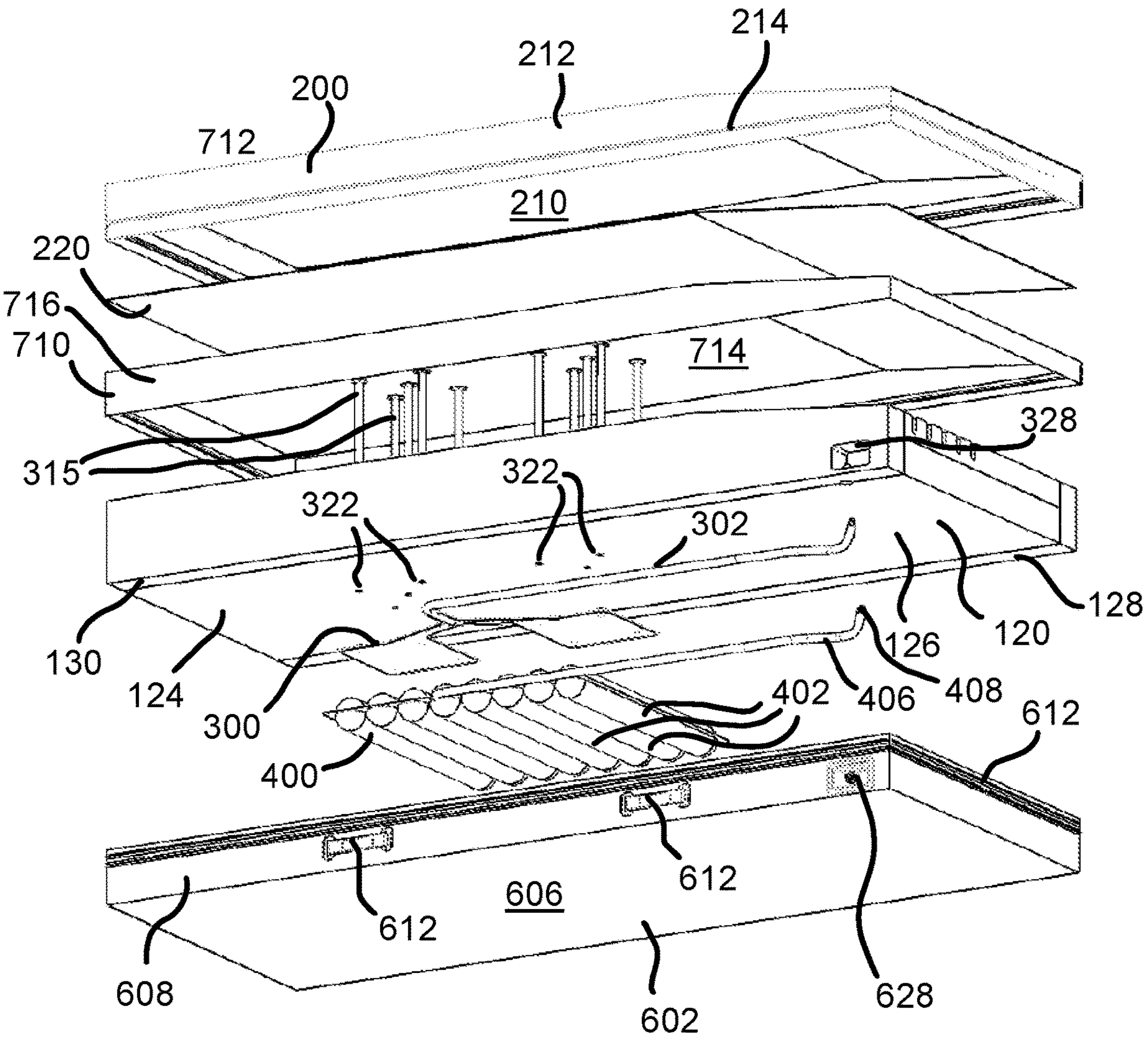
FIG. 3 is an exploded view, taken from a bottom, right side, of the patient support of FIG. 1.

With continued reference to FIGS. 2 and 3, in this embodiment, the air diffusion layer 220 which is disposed above the resilient support layer 120 receives air from an air distribution manifold 300. Notably, the air diffusion layer 220 is configured to diffuse air received from the air distribution manifold 300. The function provided by the air distribution manifold 300 and the air diffusion layer 220 may be referred to as a "low air loss" feature. The air diffusion layer 220 is disposed between the top moisture permeable layer 200 and the resilient support layer 120. The air diffusion layer 220 may be made of a compressible and/or crushable and/or resilient material having a selected thickness, such as a 3D spacer that enables air to be distributed therein and to diffuse therethrough, while providing convenient comfort to the patient. The selected thickness of the air diffusion layer 220 may be from 4 mm to 10 mm as a nonlimitative example. The air diffusion layer 220 may be made of fabrics other than a 3D spacer fabric in other embodiments.

In this embodiment, the air diffusion layer 220 is attached to the top moisture permeable layer 200. For example, the intermediate air diffusion layer 220 is provided with an attachment element (not shown) extending at least partially along its periphery. The attachment element (not shown) may cooperate with a corresponding attachment element (not shown) provided on the top moisture permeable layer 200 and extending at least partially along its periphery. Exemplary attachment elements may include a zipper, buttons or attachment straps for example in order to provide a removable attachment. Alternatively, the intermediate air diffusion layer 220 may be permanently attached to the top moisture permeable layer 200, for example by radiofrequency (RF) or ultrasound welding, sewing or other appropriate techniques.

Figure 4:
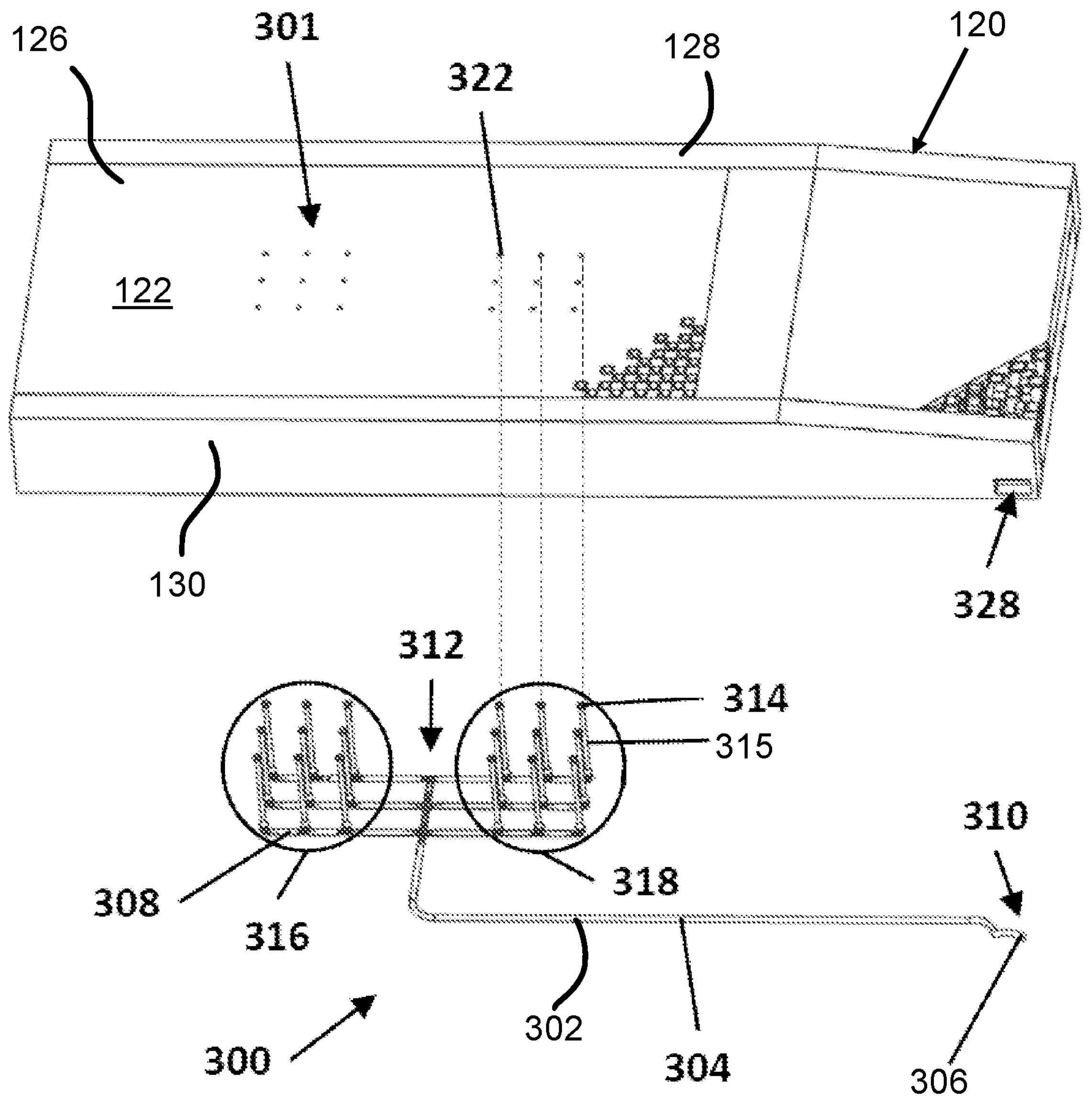
FIG. 4 is an exploded view, taken from a top, right side, of an air distribution manifold and a resilient support layer of the patient support of FIG. 1.

The air distribution manifold 300 is mountable between the top moisture permeable layer 200 and the bottom layer 602. In this embodiment, the air distribution manifold 300 is mountable at least partially within the resilient support layer 120. As shown in FIG. 4, the air distribution manifold 300 is provided with an elongated conduit 302 mounted horizontally below the lower surface 124 of the resilient support layer 120. The conduit 302 has a main supply hose 304 and a connector 306 extending at a distal end 310 thereof. The connector 306 may be received in an opening 328 defined on the side of the resilient support layer 120 and also in an opening 628 defined on the side of the bottom layer 602. The openings 328, 628 may be defined on the lower sides of the resilient support layer 120 and the bottom layer 602 respectively in other embodiments. The conduit 302 also has a plurality of supply hose extensions 308 extending at an end portion 312 opposed to the distal end 310 thereof and operatively connected to the main supply hose 304. In this example, three supply hose extensions 308 are provided parallel to each other on each side of the end portion 312 of the main supply hose 304. The bottom air distribution manifold 300 further has a plurality of air distribution conduits 315, each being operatively connected to the main supply hose 304 through a corresponding supply hose extension 308, and each extending substantially perpendicularly therefrom.

As shown in FIG. 4, the arrangement of the air distribution conduits 315 defines a predetermined pattern relative to the upper surface 122 of the resilient support layer 120 for defining a microclimate managed area 301. In this embodiment, the air distribution conduits 315 are arranged in first and second distant groups 316, 318, each devised to distribute air to a specific distinct area. In this embodiment, the resilient support layer 120 has a plurality of air circulation apertures 322 extending from the upper surface 122 to the lower surface 124. Notably, in this embodiment, the air distribution conduits 315 are mounted within respective ones of the air circulation apertures 322.

The air distribution manifold 300 may be configured differently in other embodiments.

The air distribution manifold 300 is in fluid communication with a pump in order to receive air therefrom. Notably, the air received from the pump is discharged via the air distribution conduits 315 to the air diffusion layer 220 where the air is diffused. A controller controls the operation of the pump in order to selectively route air to the air distribution manifold 300.

It is contemplated that, in some embodiments, the air diffusion layer 220 and the air distribution manifold 300 could be omitted.

Returning to FIGS. 2 and 3, in this embodiment, a fluid-resistant envelope 710 overlies the resilient support layer 120. The fluid-resistant envelope 710 has an upper surface 712, an opposed lower surface 714 and a peripheral wall 716 extending downwardly from the upper and lower surfaces 712, 714. The peripheral wall 716 extends along the periphery of the resilient support layer 120. The fluid-resistant envelope 710 is configured to protect the resilient support layer 120 and other internal components of the patient support 102 from exposure to liquids. In this embodiment, the fluid-resistant envelope 710 defines a plurality of air circulation apertures 718 (FIG. 2) in fluid communication with the air distribution conduits 315 for enabling free air circulation though the fluid-resistant envelope 710. Notably, the air circulation apertures 718 are aligned with the air circulation apertures 322 of the resilient support layer 120. In some cases, the air distribution conduits 315 may be welded or otherwise fastened to the fluid-resistant envelope 710 to further ensure that liquids do not pass through the fluid-resistant envelope 710. The fluid-resistant envelope 710 may be attached to the bottom layer 602 or to the resilient support layer 120 in any suitable way (e.g., via appropriate attachment elements).

It is contemplated that, in some embodiments, the fluid-resistant envelope 710 could enclose the resilient support layer 120, the air distribution manifold 300 and the inflatable bladder 400.

The fluid-resistant envelope 710 may be omitted in other embodiments.

The inflatable bladder 400 and its functionality will now be described in greater detail with reference to FIGS. 2, 3 and 5A. As shown in FIG. 2, the inflatable bladder 400 is disposed underneath part of the lower surface 124 of the resilient support layer 120. As such, the inflatable bladder 400 is disposed between the resilient support layer 120 and the bottom layer 602. Thus, in use, the resilient support layer 120 is disposed between the patient and the inflatable bladder 400. This position of the inflatable bladder 400 is optimal to provide comfort for the patient while still allowing the inflatable bladder 400 to function effectively. In this embodiment, the inflatable bladder 400 is positioned to be disposed underneath the central portion 126 of the resilient support layer 120. Moreover, with reference to FIG. 1, the inflatable bladder 400 is positioned such that, in use, the inflatable bladder 400 is aligned, in a longitudinal direction of the patient support 102, with a portion of the patient's body corresponding to a back and a pelvic region of the patient. In particular, in use, the inflatable bladder 400 is aligned, in the longitudinal direction of the patient support 102, with a center of mass CM of the patient. A retaining strap (not shown) may be fixed to each longitudinal end of the inflatable bladder 400 and to the bottom layer 602 (or any other suitable layer) to retain the inflatable bladder 400 in place.

As shown in FIGS. 2 and 3, in this embodiment, the inflatable bladder 400 has a plurality of elongated cells 402 that are in fluid communication with each other. The provision of various cells 402 may provide stability to the inflation process of the inflatable bladder 400 as a generally constant thickness throughout the inflatable bladder 400 is obtained during its inflation. Furthermore, in this embodiment, the inflatable bladder 400 is positioned such that each elongated cell 402 thereof is elongated in a transverse direction of the patient support 102. It is contemplated that, in other embodiments, the elongated cells 402 could be oriented differently. As shown in FIG. 2, in this example, the inflatable bladder 400 has a single port 404 through which air flows into and out of the inflatable bladder 400. It is contemplated that, in other embodiments, the bladder 400 may be provided with additional ports. A conduit 406 is fluidly connected to the port 404 for routing air to the inflatable bladder 400. A distal end of the conduit 406 may be provided with a connector 408 that is received in the openings 328, 628 of the resilient support layer 120 and the bottom layer 602.

Figure 5A:
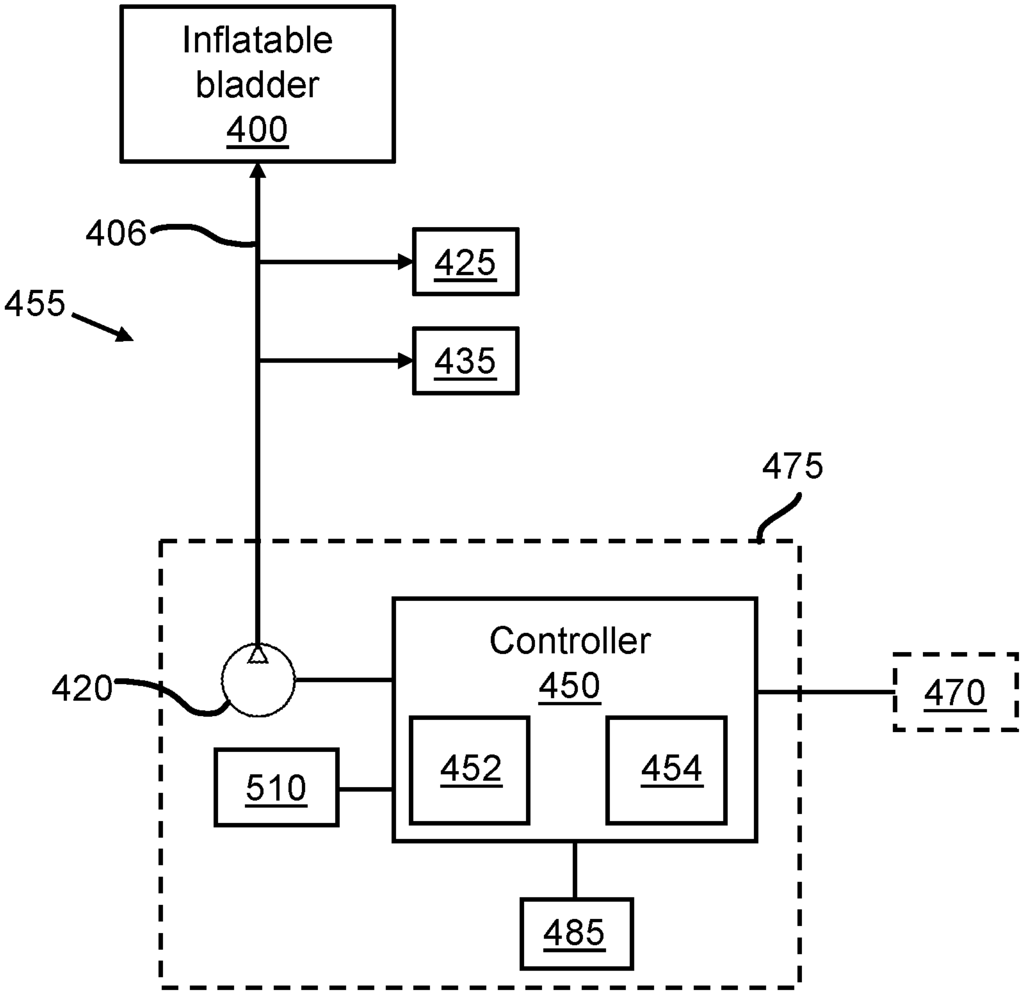
FIG. 5A is a schematic representation of a pneumatic system of the patient support system of FIG. 1.

As shown in FIGS. 1, 2 and 5A, the inflatable bladder 400 is in fluid communication with a pump 420 such that air can be pumped thereby to the inflatable bladder 400. The pump 420 may be any suitable pump that compresses air into the associated pneumatic system. As shown in FIG. 5A, the pump 420 is in communication with a controller 450 which is operable to selectively activate the pump 420 to inflate the inflatable bladder 400. Notably, the controller 450 is configured to actuate the pump 420 so that the inflatable bladder 400 reaches an operating pressure thereof at which the inflatable bladder 400 is considered adequately inflated to temporarily rigidify the patient support 102. The operating pressure of the inflatable bladder 400 is relatively low. For instance, in this example, the operating pressure of the inflatable bladder 400 is approximately 2.5 psi (i.e., ±0.5 psi). The operating pressure of the inflatable bladder 400 may be different in other embodiments.

As shown in FIG. 5A, the controller 450 has a processor unit 452 for carrying out executable code, and a non-transitory memory module 454 that stores the executable code in a non-transitory medium (not shown) included in the memory module 454. The processor unit 452 includes one or more processors for performing processing operations that implement functionality of the controller 450. The processor unit 452 may be a general-purpose processor or may be a specific-purpose processor comprising one or more preprogrammed hardware or firmware elements (e.g., application-specific integrated circuits (ASICs), electrically erasable programmable read-only memories (EEPROMs), etc.) or other related elements. The non-transitory medium of the memory module 454 may be a semiconductor memory (e.g., read-only memory (ROM) and/or random-access memory (RAM)), a magnetic storage medium, an optical storage medium, and/or any other suitable type of memory. While the controller 450 is represented as being one entity in this implementation, it is understood that the controller 450 could comprise separate entities for controlling components separately.

Figure 9:
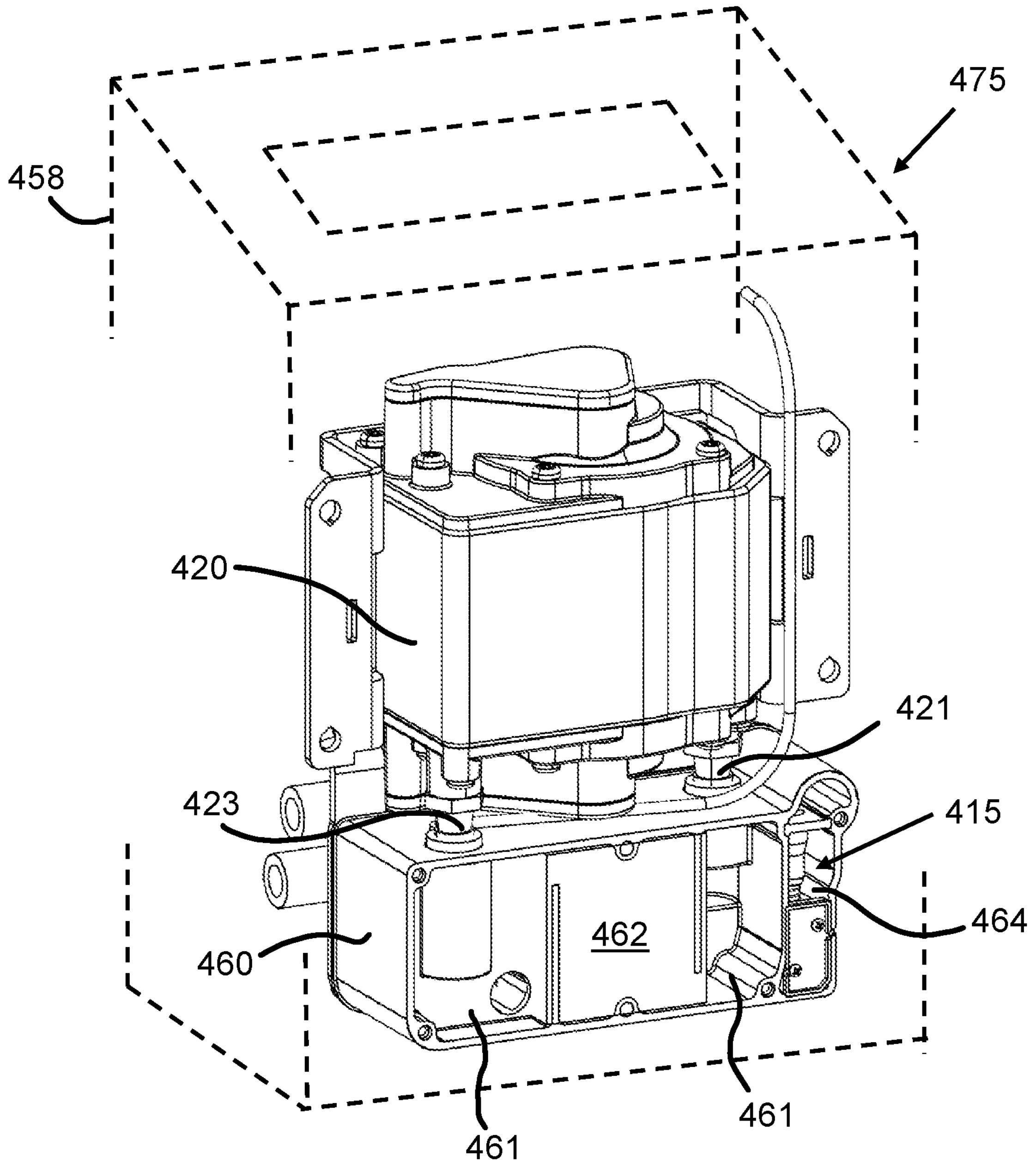
FIG. 9 is a top, left side perspective view of an air supply module of the patient support system of FIG. 8, showing part of a housing of the air supply module in dashed lines to expose part of a supply enclosure with a faceplate thereof removed.

As shown schematically in FIG. 5A, the controller 450 and the pump 420 may be part of an air supply module 475 having a housing (see housing 458 in FIG. 9 for example) in which the controller 450 and the pump 420 are enclosed. For instance, in use, the air supply module 475 may be positioned near the patient support 102 (e.g., at the foot of a bed on which the patient support 102 is disposed). The air supply module 475 may include one or more user-actuated controls 485 to allow a user to control the operation of the controller 450 and thereby of the pump 420. In this embodiment, the user-actuated control 485 is actuated to send a signal to the controller 450 that causes the controller 450 to activate the pump 420. It is contemplated that, in some embodiments, the same user-actuated control 485 or a different user-actuated control could be actuated to send a signal to the controller 450 that causes the controller 450 to interrupt air flow to the inflatable bladder 400, such as by deactivating the pump 420 and/or by controlling a valve that interrupts air flow to the inflatable bladder 400. The user-actuated control 485 may be implemented in various ways. For instance, in this embodiment, the user-actuated control 485 is a push-button. In other embodiments, the user-actuated control 485 may be a control element (i.e., a selectable icon) in a touch screen (not shown) of the air supply module 475.

The controller 450 is operable to interrupt air flow to the inflatable bladder 400 based on one or more input parameters. In this embodiment, the controller 450 interrupts air flow to the inflatable bladder 400 by deactivating the pump 420. In some embodiments, the controller 450 could interrupt air flow to the inflatable bladder 400 by causing one or more valves to be actuated. In this embodiment, the controller 450 may interrupt air flow to the inflatable bladder 400 based on a pressure within a pneumatic system 455 (FIG. 5A) formed in part by the pump 420 and the inflatable bladder 400. To that end, in this embodiment, the controller 450 is in communication with a pressure sensor 510 (FIG. 5A) that is configured to sense a pressure within the pneumatic system 455. More specifically, in this example, the pressure sensor 510 is positioned to sense the pressure at the output of the pump 420. The controller 450 is operable to interrupt air flow to the inflatable bladder 400 in order to cease air flow to the inflatable bladder 400 based at least in part on the pressure sensed by the pressure sensor 510. More specifically, the controller 450 is configured to deactivate the pump 420 in response to the pressure sensed by the pressure sensor 510 being greater than a predetermined threshold pressure. For example, the predetermined threshold pressure may be equal to or greater than 3 psi (i.e., approximately 20 kPa). This can prevent the inflatable bladder 400 from being overpressurized.

In addition, the controller 450 may interrupt air flow to the inflatable bladder 400 (e.g., by deactivating the pump 420) based on a pressurization time associated with the inflation of the inflatable bladder 400. Notably, in this embodiment, the inflatable bladder 400 is configured to be inflated temporarily to allow sufficient time for the patient to either change positions on the patient support 102, egress from the patient support 102, and/or receive a treatment on the patient support 102. Thus, in this embodiment, the controller 450 calculates the pressurization time associated with the inflatable bladder 400 and interrupts air flow to the inflatable bladder 400 based on the pressurization time. In this embodiment, the pressurization time associated with the inflatable bladder 400 is the amount of time that the pressure within the pneumatic system is at the operating pressure of the inflatable bladder 400. Therefore, the pressurization time associated with the inflatable bladder 400 is counted by the controller 450 beginning at the moment that the pressure within the pneumatic system 455 as sensed by the pressure sensor 510 reaches the operating pressure of the inflatable bladder 400. In particular, in this embodiment, the controller 450 begins counting the pressurization time associated with the inflatable bladder 400 in response to the pressure sensed by the pressure sensor 510 being greater than or equal to a predetermined inflation pressure that is indicative of the inflatable bladder 400 being at a desired inflation level. For example, the predetermined inflation pressure may correspond to the operating pressure of the inflatable bladder 400 and may be between 2 and 3 psi inclusively, such as 2 psi approximately.

It is contemplated that, in some embodiments, the pressurization time associated with the inflatable bladder 400 could be counted by the controller 450 based on a different monitored parameter. For instance, in some embodiments, the pressurization time associated with the inflatable bladder

400 could be the amount of time that the pump 420 has been active or the amount of time that a valve is in a given position that allows air flow to the inflatable bladder 400.

In this example, the controller 450 interrupts air flow to the inflatable bladder 400 in response to the pressurization time associated with the inflatable bladder 400 being equal to or greater than a threshold pressurization time. For instance, the threshold pressurization time may be between 10 and 30 minutes inclusively. In this embodiment, the threshold pressurization time is approximately 20 minutes (i.e., ±5 minutes). This allows ceasing the inflation of the inflatable bladder 400 after a set amount of time that will be sufficient for the patient to be repositioned on the patient support 102, or to egress the patient support 102 and/or for a treatment to be administered by a medical practitioner or caregiver. As such, the medical professional or caregiver attending to the patient is not required to personally stop the inflation of the inflatable bladder 400 since the controller 450 will itself automatically stop air flow to the inflatable bladder 400 once the threshold pressurization time is reached. This may be helpful to avoid accidentally leaving the patient on the patient support 102 with the inflatable bladder 400 in its inflated state which could become uncomfortable for the patient over an extended period of time.

Furthermore, as shown in FIG. 5A, in this embodiment, a check valve 425 is in fluid communication with the inflatable bladder 400 in order to limit pressure within the inflatable bladder 400. The check valve 425 thus provides an additional safety measure to avoid overpressurizing the inflatable bladder 400. The check valve 425 is configured to open at a cracking pressure at which air is discharged through the check valve 425. The check valve 425 is selected such that its cracking pressure allows the inflatable bladder 400 to operate at its operating pressure. In this embodiment, the cracking pressure of the check valve 425 is less than 3 psi. The cracking pressure of the check valve 425 may be different in other embodiments. An outlet of the check valve 425 may be in fluid communication with an exterior of the patient support 102. In other words, the check valve 425 may discharge air exteriorly from the patient support 102 (e.g., through an exhaust port in the patient support 102).

In addition, as shown in FIG. 5A, in this embodiment, a flow control valve 435 is in fluid communication with the inflatable bladder 400. The flow control valve 435 is configured to allow air flow therethrough from the inflatable bladder 400 in order for the inflatable bladder 400 to be able to be deflated once the air flow to the inflatable bladder 400 has been interrupted (e.g., once the pressurization time of the inflatable bladder 400 reaches the threshold pressurization time as discussed above). As will be appreciated, the flow control valve 435 remains open throughout its operation, even when air flow to the inflatable bladder 400 is ongoing. As such, in this example, when air flow to the inflatable bladder 400 is ongoing, a certain volume of air flows through the flow control valve 435 and outward from the pneumatic system 455 (e.g., through an exhaust port in the patient support 102). Thus, the flow control valve 435 allows air flow therethrough at a discharge flow rate that is less than a flow rate of the pump 420 such that, when air flow to the inflatable bladder 400 is ongoing, most of the air that is pumped by the pump 420 is distributed to the inflatable bladder 400.

Alternatively or additionally to the flow control valve 435, in some embodiments, as shown in FIG. 2, the inflatable bladder 400 may define a plurality of relief apertures 405 through which air can flow out of the inflatable bladder 400. The relief apertures 405 are sized such that the flow rate of air discharged therethrough is relatively small compared to the air flow received within the inflatable bladder 400 when the inflatable bladder 400 is being inflated. For instance, in this example, two relief apertures 405 are provided, each having a diameter of approximately 1 mm (their size is exaggerated in FIG. 2 for ease of reference). As such, air can flow out of the relief apertures 405 to ensure that the inflatable bladder 400 is deflated once its inflation is no longer needed.

In this embodiment, the check valve 425 and the flow control valve 435 are positioned within the patient support 102, at locations that are not bothersome to the patient. It is contemplated that, in other embodiments, the check valve 425 and the flow control valve 435 could be integrated as part of the air supply module 475.

Figure 5B:
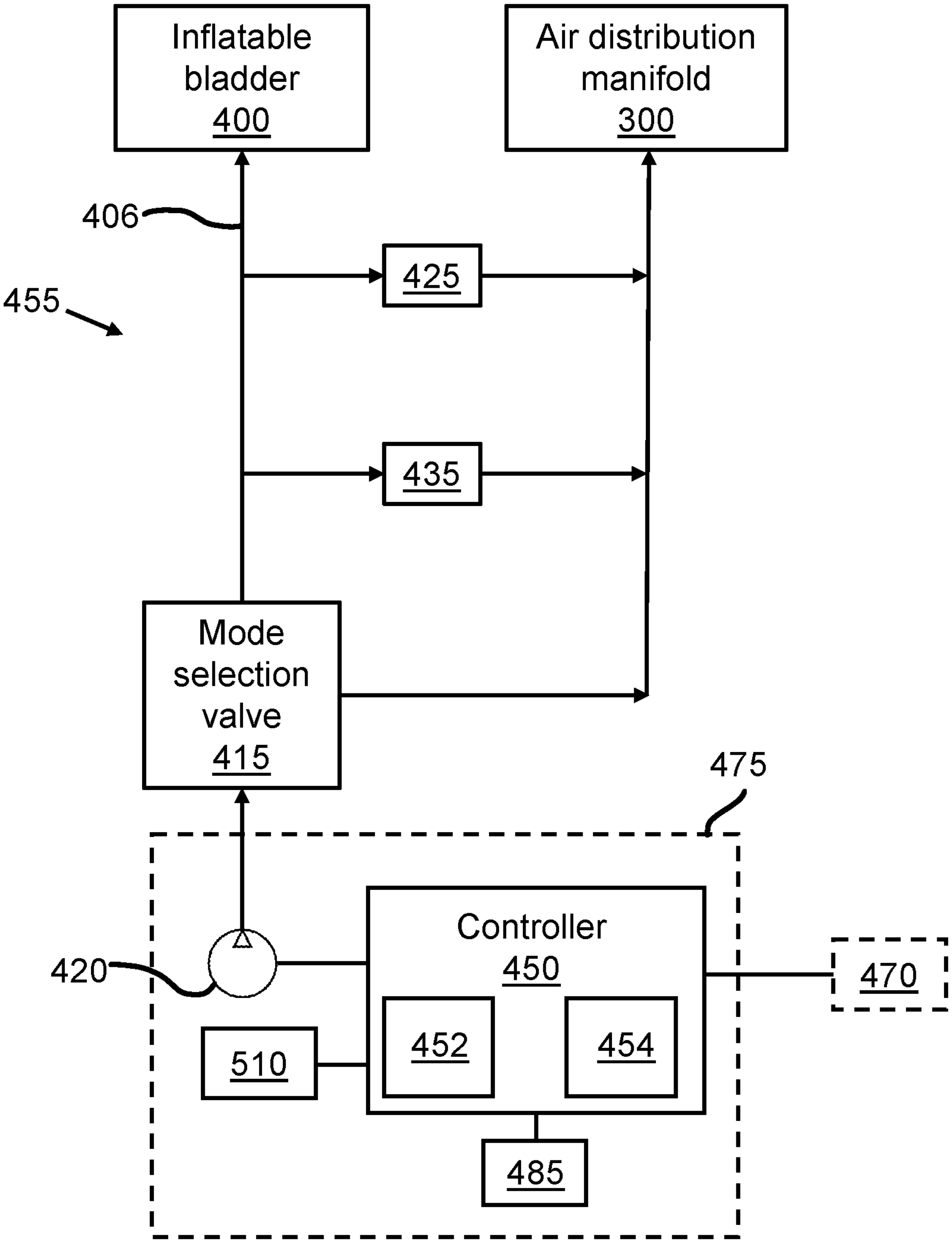
FIG. 5B is a schematic representation of the pneumatic system of the patient support system of FIG. 1 in accordance with an alternative embodiment of the present technology.

With reference now to FIG. 5B, in an alternative embodiment, the pneumatic system 455 also includes the air distribution manifold 300 such that air is selectively routed through the pneumatic system 455 to at least one of the inflatable bladder 400 and the air distribution manifold 300. As such, in this embodiment, the pump 420 is operable to inflate the bladder 400 and also to route air to the air distribution manifold 300. As will be appreciated, a more cost-efficient and compact system may be obtained by ensuring that the single pump 420 services both the inflatable bladder 400 and the air distribution manifold 300. The pump 420 is in selective fluid communication with the inflatable bladder 400 and the air distribution manifold 300 via a mode selection valve 415 that is provided in the pneumatic system 455 upstream from the inflatable bladder 400 and the air distribution manifold 300. The mode selection valve 415 is configured to selectively operate the pneumatic system 455 in one of two modes, namely in a bladder inflation mode or in an air diffusion mode. In the bladder inflation mode, air is primarily routed to the inflatable bladder 400 to inflate the inflatable bladder 400. In other words, at least a majority of the air pumped by the pump 420 is routed to the inflatable bladder 400. Conversely, in the air diffusion mode, air is discharged to the air distribution manifold 300 and thereby distributed to the air diffusion layer 220. That is, at least a majority of the air pumped by the pump 420 is routed to the air distribution manifold 300 and thus to the air diffusion layer 220. To that end, the mode selection valve 415 is movable between (i) a bladder inflation position in which the pneumatic system 455 is in the bladder inflation mode such that the mode selection valve 415 fluidly connects the pump 420 to the inflatable bladder 400 to inflate the inflatable bladder 400 and (ii) an air diffusion position in which the pneumatic system 455 is in the air diffusion mode such that the mode selection valve 415 fluidly connects the pump 420 to the air distribution manifold 300 to distribute air to the air diffusion layer 220.

Figure 6:
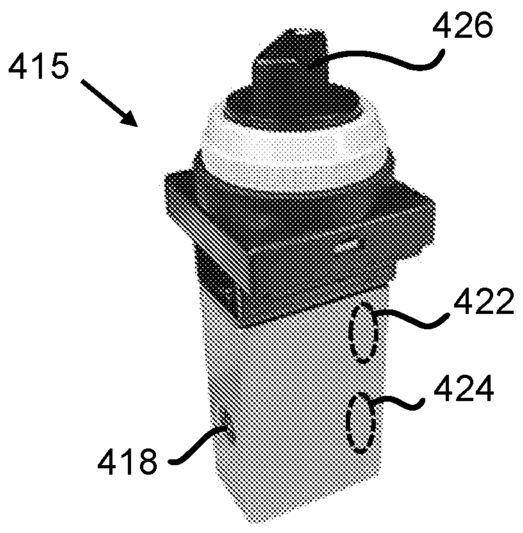
FIG. 6 is a perspective view of a mode selection valve of the pneumatic system of FIG. 5B.

The mode selection valve 415 may be implemented differently in various embodiments. With reference to FIG. 6, in this embodiment, the mode selection valve 415 is a mechanical two-position valve that is movable by a user (e.g., a medical professional or caregiver) between the bladder inflation position and the air diffusion position. As can be seen, in this embodiment, the mode selection valve 415 has an input port 418 and two output ports 422, 424. The mode selection valve 415 also has a hand-actuated switch 426. The pump 420 is fluidly connected to the input port 418, while the output ports 422, 424 are fluidly connected to the inflatable bladder 400 and the air distribution manifold 300 respectively. The mode selection valve 415 is moved between the bladder inflation position and the air diffusion position by actuating the switch 426 in order to selectively communicate the input port 418 with one of the output ports 422, 424.

Returning to FIG. 5B, when the mode selection valve 415 is moved to the bladder inflation position, the mode selection valve 415 routes air through the conduit 406 and thus to the inflatable bladder 400. The inflatable bladder 400 is thus inflated by the pump 420 until it reaches the operating pressure of the inflatable bladder 400.

As shown in FIG. 5B, in this embodiment, the check valve 425 fluidly connects the inflatable bladder 400 to the air distribution manifold 300 when the check valve 425 opens. That is, when the check valve 425 opens as a result of reaching its cracking pressure, air flow is routed through the check valve 425 to the air distribution manifold 300. This may allow a certain volume of air to be distributed by the air distribution manifold 300 to the air diffusion layer 220 even when the mode selection valve 415 is in the bladder inflation position. Furthermore, in this embodiment, the flow control valve 435 similarly fluidly connects the inflatable bladder 400 to the air distribution manifold 300. As such, the flow control valve 435 allows the air that is discharged from the inflatable bladder 400 during deflation of the inflatable bladder 400 to be routed to the air distribution manifold 300. In other words, once the mode selection valve 415 is moved to the air diffusion position, air contained within the inflatable bladder 400 is discharged via the flow control valve 435. When the mode selection valve 415 is in the bladder inflation position, the controller 450 interrupts air flow to the inflatable bladder 400 in the same manner as described above, namely in response to either an excessive pressure being sensed by the pressure sensor 510 (e.g., when the portion of the pneumatic system 455 associated with the air distribution manifold 300 is clogged) and/or in response to the pressurization time associated with the inflatable bladder 400 reaching the threshold pressurization time (e.g., approximately 20 minutes). In particular, in this example, the controller 450 deactivates the pump 420 in either scenario to interrupt air flow to the inflatable bladder 400. In such an eventuality, the user could then move the mode selection valve 415 back to the air diffusion position and activate the pump 420 (e.g., via the user-actuated control 485) to begin routing air to the air distribution manifold 300.

The mode selection valve 415 may be configured differently in other embodiments.

For instance, in an alternative embodiment, the mode selection valve 415 could be an air piloted valve having a pilot port for selectively receiving an air flow that determines the position of the mode selection valve 415. In particular, the pilot port of the mode selection valve 415 is an internal pilot port and therefore the mode selection valve 415 is an internally piloted valve. A non-limiting example of such a valve is for instance a 5/2 internal pilot valve of the type offered by SMC Corporation under model no. VZM450-01-00. In this embodiment, the mode selection valve 415 is actuated by the user via a user-actuated plunger of the mode selection valve 415 in order to move the mode selection valve 415 to the bladder inflation position. Upon moving the mode selection valve 415 to the bladder inflation position, air is routed by the pump 420 to the inflatable bladder 400. Part of the air flow from an output of the mode selection valve 415 that connects to the inflatable bladder 400 is routed internally to the internal pilot port which maintains the mode selection valve 415 in the bladder inflation position. Notably, the mode selection valve 415 is maintained in the bladder inflation position in response to the pressure at the internal pilot port being equal to or greater than a predetermined pressure. Once the pneumatic system 455 reaches the operating pressure of the inflatable bladder 400, the controller 450 begins counting the pressurization time associated with the inflatable bladder 400 as described above. Upon the pressurization time reaching the threshold pressurization time, the pump 420 is deactivated by the controller 450. As a result, the pressure at the pilot port of the mode selection valve 415 decreases below the predetermined pressure. An internal spring of the mode selection valve 415 which biases the mode selection valve 415 to the air diffusion position thus returns the mode selection valve to the air diffusion position since the force of the internal spring is no longer opposed by pressure at the pilot port.

In this example, the controller 450 then reactivates the pump 420 in order to continue the operation of the pneumatic system 455 in the air diffusion mode. The controller 450 may be programmed to delay the reactivation of the pump 420 for a brief moment (e.g., 10 seconds) to allow the pressure within the pneumatic system 455 to decrease sufficiently such as to ensure that the mode selection valve 415 is returned to the air diffusion position. Therefore, as will be appreciated, in this embodiment, the pneumatic system 455 automatically operates in the air diffusion mode after the end of the pressurization time of the inflatable bladder 400 without requiring user intervention. This may further contribute to ensuring the continued comfort of the patient.

In another alternative embodiment, the mode selection valve 415 could be a pneumatic timer. In particular, in this alternative embodiment, the mode selection valve 415 has a user-actuated plunger that, upon being actuated by the user, causes a portion of the input air provided by the pump 420 to activate a timing function of the mode selection valve 415. This causes the mode selection valve 415 to move to the bladder inflation position and the timing function to begin counting down a set delay time programmed at the mode selection valve 415. Once the set delay time has expired, the mode selection valve 415 moves back to the air diffusion position. As will be appreciated, in this alternative embodiment, the controller 450 does not interrupt air flow to the inflatable bladder 400 based on the pressurization time associated with the inflatable bladder 400 since the mode selection valve 415 itself controls the amount of time that air is routed to the inflatable bladder 400. Indeed, the pneumatic system 455 is switched back to the air diffusion mode without deactivating the pump 420 which may provide a more seamless transition between the modes.

As will be appreciated from the above, the mode selection valve 415 thus allows the user to select whether to inflate the inflatable bladder 400 or to diffuse air at the air diffusion layer 220 of the patient support 102. However, as mentioned above, in some embodiments, the air distribution manifold 300 and the air diffusion layer 220 may be omitted. Therefore, in some embodiments, the mode selection valve 415 could be omitted (as shown in FIG. 5A) and therefore the controller 450 and the pump 420 could be dedicated to the operation of the inflatable bladder 400.

It is contemplated that, in some embodiments, the controller 450 could control the pump 420 to selectively inflate the inflatable bladder 400 based on a position of the patient support 102. Notably, as shown in FIGS. 5A and 5B, in some embodiments, an optional position sensor 470 is in communication with the controller 450 and is configured to transmit a signal thereto indicative of a position of the patient support 102. The controller 450 thus selectively activates the pump 420 based at least in part on the signal received from the position sensor 470. For instance, in some examples, the position sensor 470 may be configured to sense when the patient support 102 and/or a bed on which the patient support 102 is disposed is in a chair position. Notably, the chair position of the patient support 102 or the bed may be indicative that the patient wants to egress from the patient support 102. Thus, the controller 450 could automatically cause the pump 420 to inflate the inflatable bladder 400 in particular positions of the patient support 102 and/or the bed.

Figure 7:
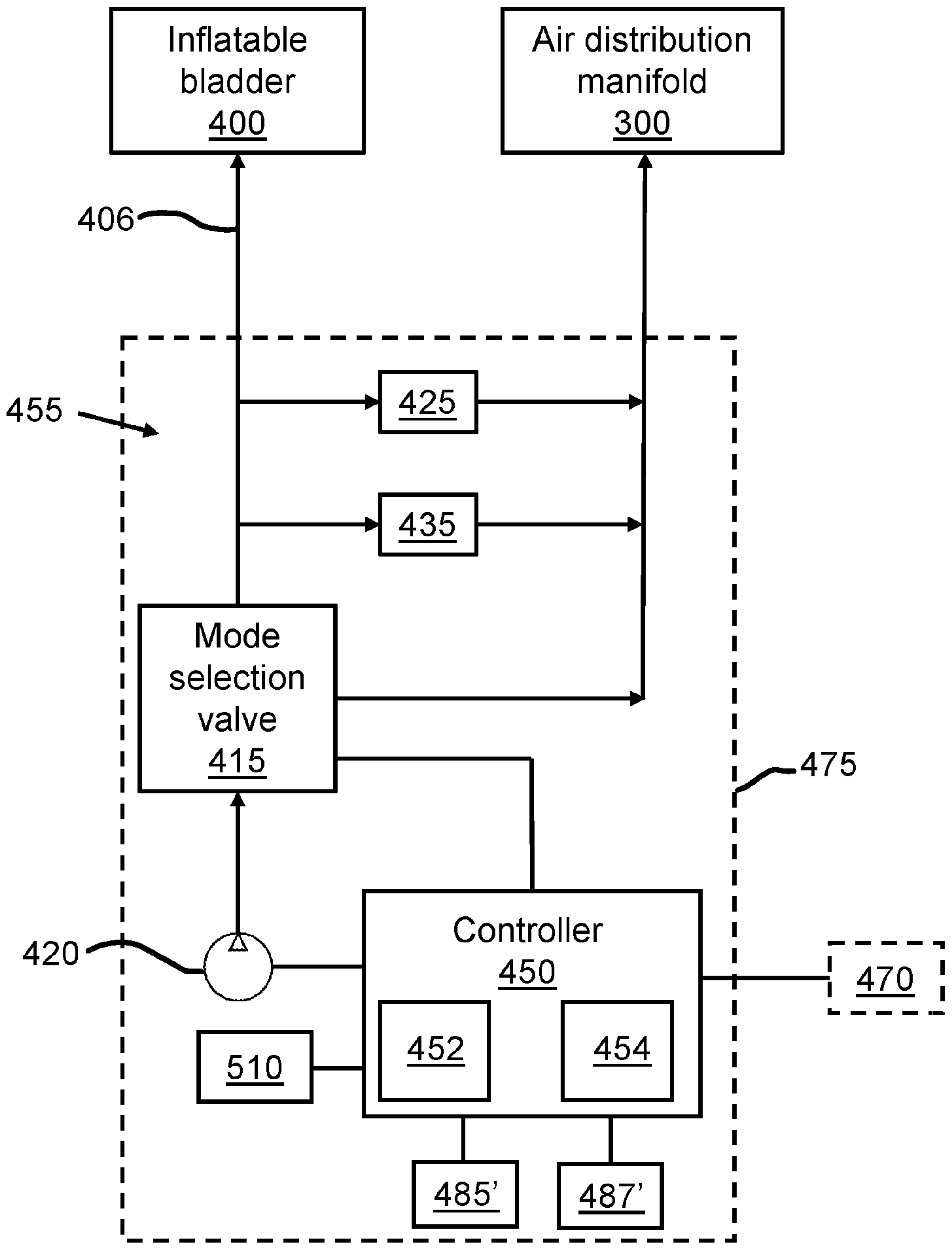
FIG. 7 is a schematic representation of the pneumatic system of the patient support system of FIG. 1 according to another alternative embodiment of the present technology.

With reference to FIG. 7, in another alternative embodiment, the mode selection valve 415 could be controlled directly by the controller 450. For instance, in such an embodiment, the mode selection valve 415 could be a solenoid valve that is in communication with the controller 450 and is movable between the bladder inflation position and the air diffusion position by the controller 450. As can be seen, in such an embodiment, the mode selection valve 415 may be integrated as part of the air supply module 475. The two output conduits from the mode selection valve 415 may thus extend from the air supply module 475 to the patient support 102 to fluidly connect the mode selection valve 415 to the inflatable bladder 400 and the air distribution manifold 300. Furthermore, in this embodiment, the controller 450 is responsive to user-actuated controls 485', 487' for selectively operating the pneumatic system 455 in the bladder inflation mode or in the air diffusion mode. Notably, the user-actuated controls 485', 487' are in communication with the controller 450, and the user-actuated control 485' (which may be referred to as a bladder inflation control 485') is actuated to operate the pneumatic system 455 in the bladder inflation mode while the user-actuated control 487' (which may be referred to as an air diffusion control 487') is actuated to operate the pneumatic system 455 in the air diffusion mode. The bladder inflation control 485' and the air diffusion control 487' could be mechanical controls (e.g., push buttons) on the air supply module 475 or selectable icons on a display of the air supply module 475.

This configuration may allow the user to actuate the bladder inflation control 485' to inflate the inflatable bladder 400 and, upon reaching the threshold pressurization time associated with the inflatable bladder 400, deactivating the pump 420 and/or move the mode selection valve 415 to the air diffusion position. For instance, the controller 450 may be programmed such that, if the bladder inflation control 485' is actuated (to operate in the bladder inflation mode) while the pneumatic system 455 is actively operating in the air diffusion mode (i.e., routing air to the air distribution manifold 300), the controller 450 moves the mode selection valve 415 to the bladder inflation position and, upon reaching the threshold pressurization time associated with the inflatable bladder 400, moves the mode selection valve 415 back to the air diffusion position to resume operating in the air diffusion mode.

Figure 8:
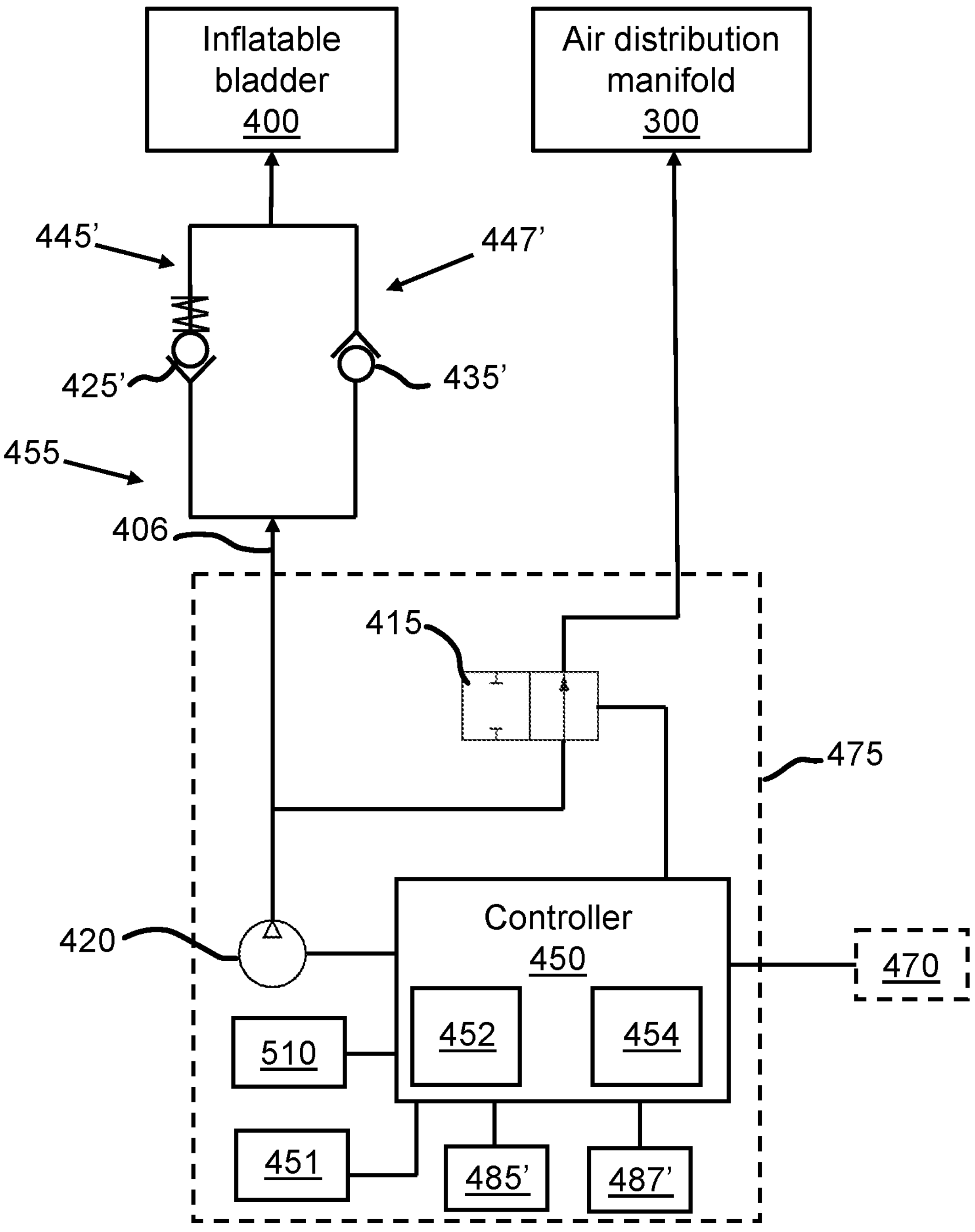
FIG. 8 is a schematic representation of the pneumatic system of the patient support system of FIG. 1 according to yet another alternative embodiment of the present technology.

FIG. 8 illustrates the pneumatic system 455 according to yet another alternative embodiment. In this alternative embodiment, the mode selection valve 415 is a 2-position 2-way solenoid valve that is controllable by the controller 450 for selectively impeding and allowing air flow from the pump 420 to the air distribution manifold 300. The mode selection valve 415 could be another type of solenoid valve in other embodiments. In its air diffusion position, the mode selection valve 415 fluidly connects the pump 420 to the air distribution manifold 300 such that air flow from the pump 420 is directed to the air distribution manifold 300, whereas air is impeded from flowing into the inflatable bladder 400. In particular, in order to prevent air from flowing into the inflatable bladder 400 in the air diffusion position of the mode selection valve 415, in this embodiment, the pneumatic system 455 includes a first check valve 425' disposed along a pneumatic passage 445' extending between the pump 420 and the inflatable bladder 400. The first check valve 425' is a spring-loaded check valve that restricts air flow in a direction from the pump 420 to the inflatable bladder 400 at a cracking pressure of approximately 0.5 psi. That is, at pressures within the pneumatic system 455 below the cracking pressure, the first check valve 425' remains closed. The first check valve 425' could have a different cracking pressure in other embodiments, such as any other pressure that is lower than the operating pressure of the inflatable bladder 400 (e.g., less than 2 psi in this embodiment). This ensures that, in the first position of the mode selection valve 415, air flow from the pump 420 is directed entirely to the air distribution manifold 300. A second check valve 435' is disposed along another pneumatic passage 447' extending between the inflatable bladder 400 and the pump 420 and that is parallel to the pneumatic passage 445'. The second check valve 435' is a free-floating check valve that does not permit air flow in the direction from the pump 420 to the inflatable bladder 400 but permits air flow in the opposite direction (from the inflatable bladder 400 to the pump 420). The functionality of the second check valve 435' will be explained below.

With continued reference to FIG. 8, the controller 450 places the mode selection valve 415 in its bladder inflation position in response to activation of the bladder inflation mode via the bladder inflation control 485'. In its bladder inflation position, the mode selection valve 415 impedes air flow to the air distribution manifold 300. This causes the air pressure in the pneumatic system 455 to increase, thereby causing the first check valve 425' to open as the pressure in the pneumatic system 455 reaches and exceeds the cracking pressure of the first check valve 425'. The inflatable bladder 400 thus begins to inflate. Meanwhile, the second check valve 435' remains closed as the pressure on opposite sides thereof is equal. The inflatable bladder 400 continues to be inflated by the pump 420 until the pressure sensed by the pressure sensor 510 (i.e., the pressure in the pneumatic system 455) reaches the operating pressure of the inflatable bladder 400. Once the operating pressure of the inflatable bladder 400 has been reached, the controller 450 deactivates the pump 420 to cease air flow to the inflatable bladder 400. As long as the pressurization time associated with the inflatable bladder 400 does not reach the threshold pressurization time as explained in earlier embodiments and the controller 450 does not receive a signal from the bladder inflation control 485' to cease operating in the bladder inflation mode, the inflatable bladder 400 is maintained at its operating pressure by re-activating the pump 420 as needed. Thus, the inflatable bladder 400 is maintained at its operating pressure until the user deactivates the bladder inflation mode (via the bladder inflation control 485') or the pressurization time associated with the inflatable bladder 400 reaches the threshold pressurization time.

In the embodiment illustrated in FIG. 8, the inflatable bladder 400 defines the aforementioned relief apertures 405 for allowing air to flow out of the inflatable bladder 400. This may help prevent the excessive pressurization of the inflatable bladder 400. In some cases, an optional additional check valve (like the check valve 425 described in earlier embodiments) may also be fluidly connected to the inflatable bladder 400 to set a predetermined threshold pressure at which air will be evacuated therethrough in order to avoid excessive pressurization of the inflatable bladder 400. For instance, such a check valve may have a cracking pressure that is greater than the operating pressure of the inflatable bladder 400 (e.g., approximately 3.5 psi). Furthermore, in this embodiment, when the pneumatic system 455 is in the bladder inflation mode, the controller 450 activates an alarm element 451 (FIG. 8) in response to the pressure sensed by the pressure sensor 510 exceeding an excessive pressure threshold that is greater than the operating pressure of the inflatable bladder 400. For example, the excessive pressure threshold may be approximately 3.5 psi. The alarm element 451 may be a speaker, a light, or any other suitable element that can call the attention of the user such that the user may deactivate the bladder inflation mode or otherwise ensure that the inflatable bladder 400 is deflated.

Once the bladder inflation mode is deactivated, the mode selection valve 415 returns to its air diffusion position, therefore allowing air flow to the air distribution manifold 300. Thus, the air diffusion mode resumes if the bladder inflation mode was started when the air diffusion mode was ongoing. Alternatively, if the bladder inflation mode was started when the air diffusion mode was deactivated, the pump 420 may be deactivated by the controller 450 once the bladder inflation mode is deactivated. Once the bladder inflation mode is deactivated, the air remaining in the inflatable bladder 400 is discharged therefrom via the relief apertures 405 and via the second check valve 435'. Notably, the air discharged through the second check valve 435' may be rerouted to the air distribution manifold 300.

Figure 10:
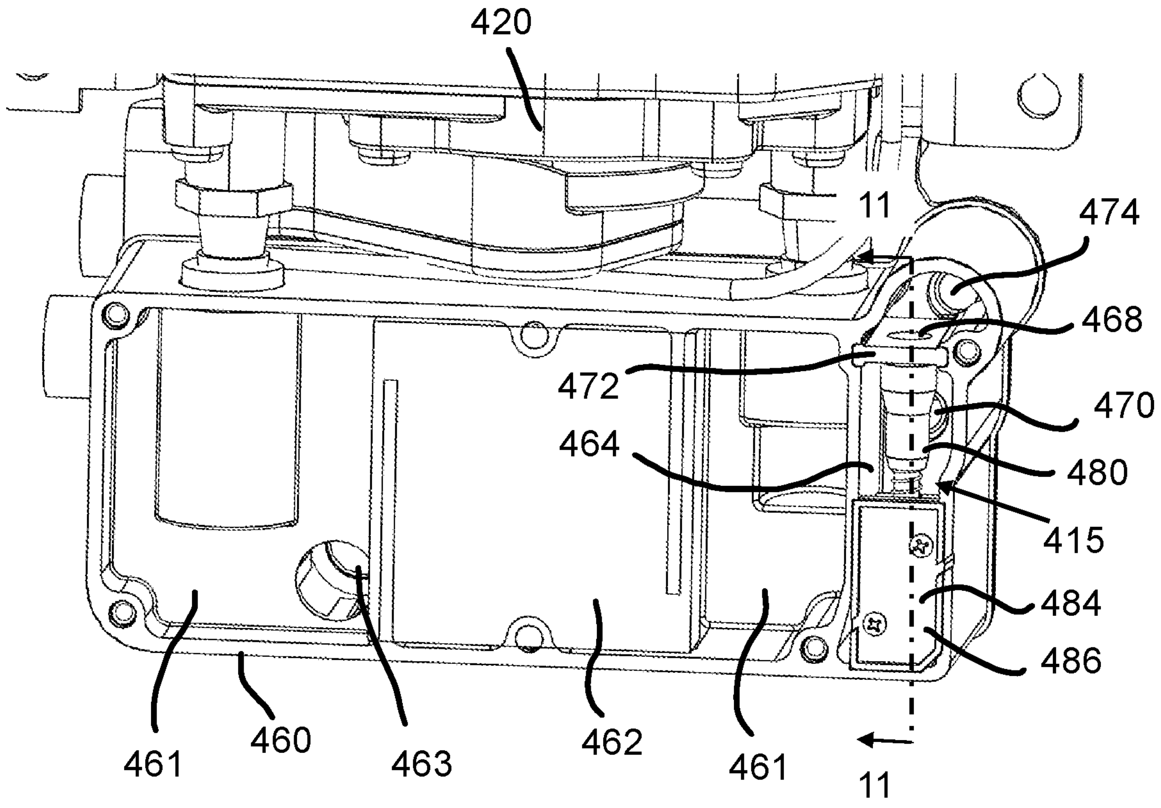
FIG. 10 is a top, right side perspective view of the supply enclosure of FIG. 9 with the faceplate thereof removed.

The configuration of the mode selection valve 415 according to an embodiment, such as the embodiment of FIG. 8 in which the mode selection valve 415 is a solenoid valve, is shown in greater detail in FIGS. 9 to 12. Notably, FIGS. 9 to 12 illustrate part of the air supply module 475, including the pump 420 and a supply enclosure 460 enclosed within a housing 458 of the air supply module 475 (partly illustrated in FIG. 9). As can be seen, the supply enclosure 460 is connected to an inlet 421 and an outlet 423 of the pump 420 and defines in part the mode selection valve 415 as will be described in greater detail below. In FIGS. 9 to 12, a faceplate of the supply enclosure 460 has been removed to expose the interior parts of the supply enclosure 460. In particular, as can be seen, the supply enclosure 460 has various air chambers 461 through which air is circulated, and contains two silencing filters 462 (only one of which is shown) for silencing the air supply module 475. In this example, the silencing filters 462 are made of foam. As best shown in FIG. 10, the supply enclosure 460 also defines an inlet hole 463 through which air enters the supply enclosure 460, into a first air chamber 461, through the illustrated silencing filter 462, into another air chamber 461, and into the inlet 421 of the pump 420. On an opposite side of the supply enclosure 460 (not shown), air is discharged from the outlet 423 of the pump 420, into an air chamber 461, through the other silencing filter 462, into another air chamber 461 and into the mode selection valve 415, where air flow can be selectively directed to one of the two air-receiving components of the patient support, namely the inflatable bladder 400 and the air distribution manifold 300.

Figure 11:
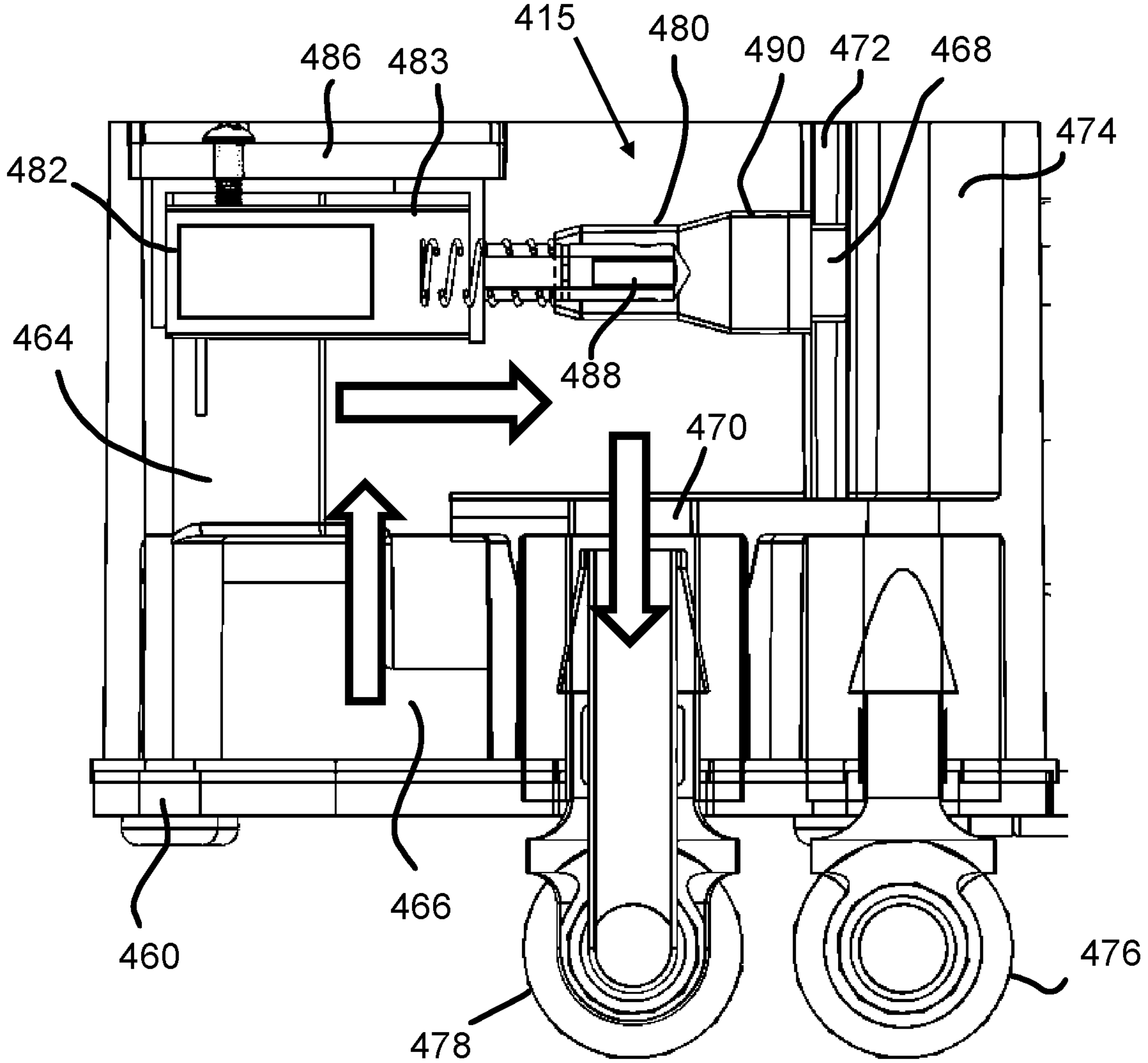
FIG. 11 is a cross-sectional view of the supply enclosure and the mode selection valve contained therein taken along line 11-11 shown in FIG. 10, showing the mode selection valve in a bladder inflation position thereof.
Figure 12:
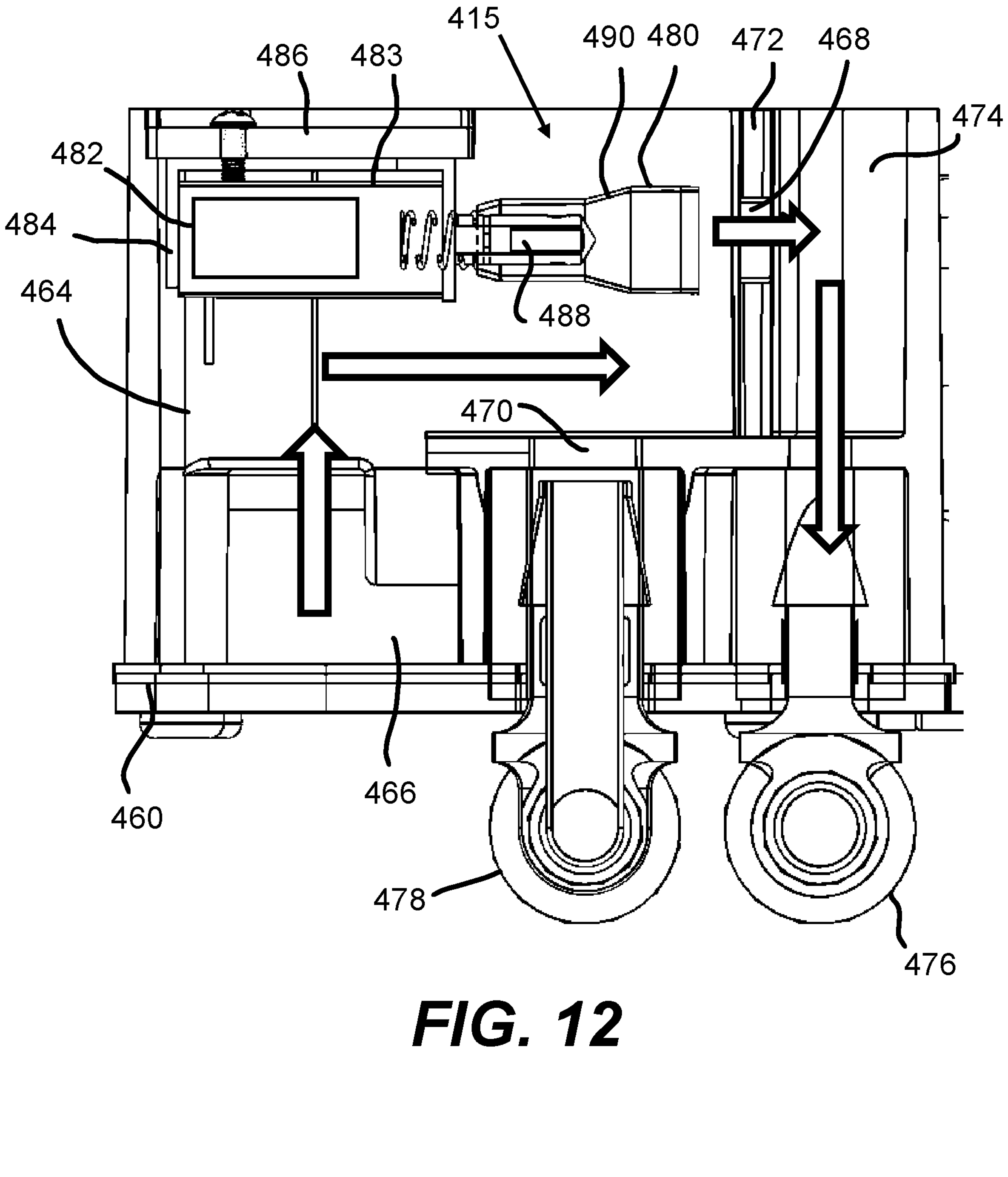
FIG. 12 is a cross-section sectional view of the supply enclosure and the mode selection valve contained therein taken along a same plane as FIG. 11 but showing the mode selection valve in an air diffusion position thereof.

In particular, as shown in FIGS. 10 to 12, the supply enclosure 460 has a valve compartment 464 which partly defines the mode selection valve 415 and can be considered to be a housing of the mode selection valve 415. As best shown in FIGS. 11 and 12, the valve compartment 464 has an inlet 466 through which air discharged by the pump 420, and two outlet ports 468, 470 through which air is discharged from the valve compartment 464. The first outlet port 468 is defined by a dividing wall 472 which separates the valve compartment 464 from an outlet compartment 474 which opens into an outlet conduit 476. The second outlet port 470 is defined by an internal wall of the valve compartment 464 and opens into an outlet conduit 478. The outlet conduit 476 is fluidly connected to the air distribution manifold 300 and the outlet conduit 478 is fluidly connected to the inflatable bladder 400. As can be seen, the mode selection valve 415 includes a movable valve assembly 480 and an actuating assembly 482 (schematically illustrated in FIGS. 11 and 12) disposed inside of a housing 483. The movable valve assembly 480 includes a retractable plunger 488 and a covering member 490 fixed to an end of the plunger 488. The covering member 490 is configured to selectively cover the outlet port 468 defined by the dividing wall 472 in order to allow or impede air flow therethrough. In this example, the mode selection valve 415 is a magnetic latching solenoid valve and therefore the actuating assembly 482 is that of a typical magnetic latching solenoid valve. The construction of the actuating assembly 482 will thus not be described in detail herein. It will be understood that such solenoid valves are actuated by inducing a magnetic field which moves an armature of the actuating assembly 482, thereby causing movement of the movable valve assembly 480.

In this embodiment, the housing 483 of the mode selection valve 415 is supported by a bracket 484 that is received in the valve compartment 464. The bracket 484 includes an outer cover 486 that is received in a recess formed in the inner walls of the valve compartment 464 to hold the bracket 484 in place. The bracket 484 may be configured differently in other embodiments.

As will be apparent, the construction of the mode selection valve 415 allows it to be relatively compact and thereby take up a limited amount of space within the air supply module 475. This can be helpful to minimize its impact on the configuration of the internal components of the air supply module 475, in addition to minimizing its impact on the size of the air supply module 475. In addition, because the mode selection valve 415 is a magnetic latching solenoid valve, its heat generation is limited compared to other types of solenoid valves. This may also be helpful in not affecting the functioning of the other components of the air supply module 475 (e.g., the controller 450).

With continued reference to FIGS. 11 and 12, the controller 450 can cause movement of the movable valve body 480 by powering the actuating assembly 482 as needed to cause extension or retraction of the plunger 488. In the bladder inflation position of the mode selection valve 415, shown in FIG. 11, the covering member 490 is in contact with the dividing wall 472 and closes the outlet port 468 in order to impede air flow through the outlet port 468 (i.e., to the air distribution manifold 300). As illustrated by the air flow arrows in FIG. 11, in the bladder inflation position of the mode selection valve 415, air incoming from the pump 420 flows into the valve compartment 464 via the inlet 466, and then flows into the outlet port 470. The air thus flows into the outlet conduit 478 which directs air to the inflatable bladder 400. Conversely, in the air diffusion position of the mode selection valve 415, shown in FIG. 12, the covering member 490 stands clear of the dividing wall 472 and thus opens the outlet port 468 to allow air flow therethrough. As illustrated by the air flow arrows in FIG. 12, in the air diffusion position of the mode selection valve 415, air incoming from the pump 420 flows into the valve compartment 464 via the inlet 466, and then flows out of the valve compartment 464 via the outlet port 468. The air thus flows into the outlet conduit 476 which directs air to the air distribution manifold 300.

Figure 13:
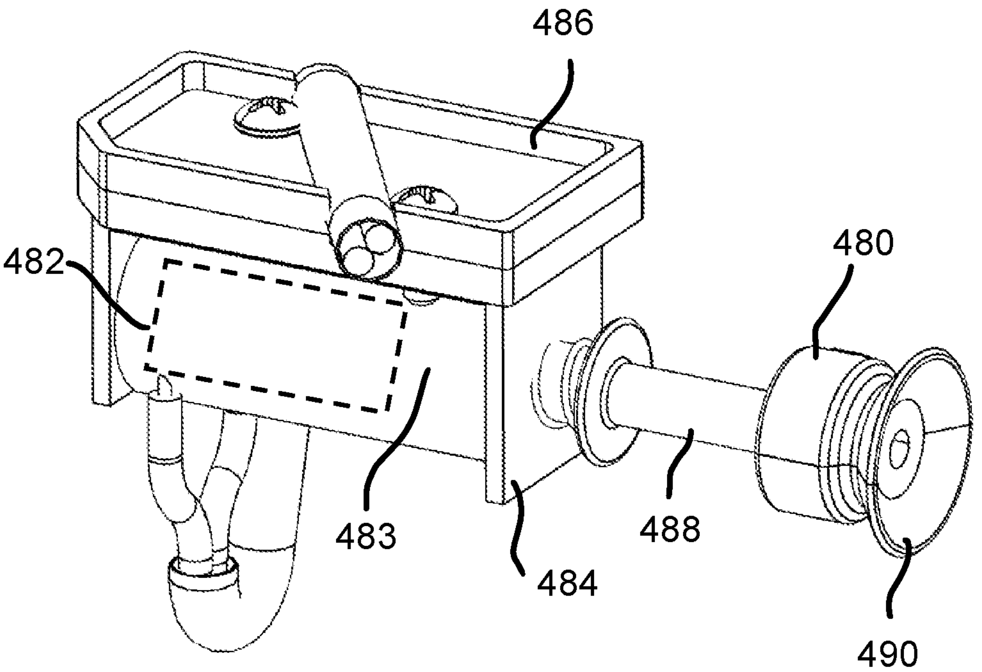
FIG. 13 is a perspective view of a movable valve assembly of the mode selection valve in accordance with an embodiment thereof in which the movable valve assembly includes a suction cup.

FIG. 13 shows another exemplary embodiment of the movable valve assembly 480. Notably, in this embodiment, the covering member 490 is a suction cup mounted to the plunger 488 and is sized and shaped to seal the outlet port 468 in the bladder inflation position of the mode selection valve 415. The suction cup 490 has a truncated cone shape which, in this example, has a size of approximately 10 mm. It has been found that by providing the suction cup 490, an efficient closing of the outlet port 468 can be obtained, notably allowing the entirety of the air flow from the pump 420 to be routed to the inflatable bladder 400 in the bladder inflation position of the mode selection valve 415.

It is contemplated that the mode selection valve 415 shown in the embodiment of FIG. 8 could be a different type of solenoid valve in other embodiments.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A patient support system comprising:

a patient support comprising:

a resilient support layer for supporting a patient, the resilient support layer having an upper surface and a lower surface opposite the upper surface, the upper surface being configured to, in use, face toward the patient supported by the resilient support layer; and a temporarily inflatable bladder disposed underneath at least part of the lower surface of the resilient support layer such that, in use, the resilient support layer is disposed between the patient and the temporarily inflatable bladder, the temporarily inflatable bladder being distanced from a head end and a foot end of the resilient support layer and positioned such that, in use, the temporarily inflatable bladder is aligned, in a longitudinal direction of the patient support, with a back and/or a pelvic region of the patient;

a pump in fluid communication with the temporarily inflatable bladder; and a controller in communication with the pump, the controller being operable to selectively activate the pump to inflate the temporarily inflatable bladder and thereby limit the immersion of the back and/or pelvic region of the patient into the resilient support layer and thereby limit an immersion of the back and/or pelvic region of the patient into the resilient support layer, the controller being configured to deactivate the pump in response to a pressurization time associated with the temporarily inflatable bladder being equal to or greater than a threshold pressurization time.

2. The patient support system of claim 1, wherein the resilient support layer comprises:

a central portion made of a first resilient material; and a left portion and a right portion disposed on a left side and a right side of the central portion respectively, the left and right portions being made of a second resilient material, the second resilient material having a greater rigidity than the first resilient material, the temporarily inflatable bladder being disposed underneath the central portion of the resilient support layer.

3. The patient support system of claim 1, wherein the resilient support layer is not inflatable.

4. The patient support system of claim 1, wherein the resilient support layer is made of foam.

5. The patient support system of claim 1, wherein the temporarily inflatable bladder defines a plurality of relief apertures for allowing fluid to flow out of the temporarily inflatable bladder.

6. The patient support system of claim 1, further comprising:

a top moisture permeable layer disposed at least partially above the resilient support layer; and a bottom layer removably connected to the top moisture permeable layer for enclosing the resilient support layer and the temporarily inflatable bladder therebetween, the temporarily inflatable bladder being disposed between the resilient support layer and the bottom layer.

7. The patient support system of claim 1, further comprising:

an air diffusion layer for diffusing air; and an air distribution manifold fluidly connected to the air diffusion layer, the air distribution manifold being configured to be fluidly connected to the pump in order to distribute air to the air diffusion layer.

8. The patient support system of claim 1, wherein:

the patient support system further comprises a pressure sensor in communication with the controller and configured to sense a pressure within a pneumatic system formed in part by the pump and the temporarily inflatable bladder; and the controller is configured to deactivate the pump in response to the pressure in the pneumatic system being greater than a predetermined threshold pressure.

9. The patient support system of claim 1, wherein the threshold pressurization time is between 10 and 30 minutes inclusively.

10. The patient support system of claim 1, wherein:

the patient support system further comprises a pressure sensor in communication with the controller and configured to sense a pressure within a pneumatic system formed in part by the pump and the temporarily inflatable bladder; and the controller begins counting the pressurization time in response to the pressure sensed by the pressure sensor being greater than a predetermined inflation pressure that is indicative of the temporarily inflatable bladder being at a desired inflation level.

11. The patient support system of claim 1, further comprising a check valve in fluid communication with the temporarily inflatable bladder, the check valve being configured to open at a cracking pressure in order to limit pressure within the temporarily inflatable bladder.

12. The patient support system of claim 1, wherein:

the patient support further comprises:

an air diffusion layer for diffusing air; and an air distribution manifold fluidly connected to the air diffusion layer, the air distribution manifold being fluidly connected to the pump in order to distribute air to the air diffusion layer;

the patient support system further comprises a mode selection valve fluidly connected to the pump for selectively routing air to the temporarily inflatable bladder and to the air distribution manifold, wherein:

the mode selection valve is movable between a first position and a second position;

in the first position, the mode selection valve fluidly connects the pump to the air distribution manifold to distribute air to the air diffusion layer; and in the second position, the mode selection valve fluidly connects the pump to the temporarily inflatable bladder to inflate the temporarily inflatable bladder.

13. The patient support system of claim 12, wherein:
the mode selection valve is a mechanical two-position valve that is movable by a user from the first position to the second position;
the mode selection valve is maintained in the second position in response to a pressure at a pilot port of the mode selection valve being equal to or greater than a predetermined pressure; and
the mode selection valve is movable from the second position to the first position in response to the pressure at the pilot port decreasing below the predetermined pressure.

14. The patient support system of claim 12, wherein the mode selection valve comprises:
a valve compartment defining a first outlet port for supplying air to the air distribution manifold and a second outlet port for supplying air to the temporarily inflatable bladder; and
a movable valve assembly for selectively closing and opening one of the first outlet port and the second outlet port.

15. The patient support system of claim 14, further comprising a first check valve disposed between the temporarily inflatable bladder and the pump for impeding air flow into the temporarily inflatable bladder, the first check valve being a spring-loaded check valve having a cracking pressure that is less than an operating pressure of the temporarily inflatable bladder.

16. The patient support system of claim 15, further comprising a second check valve disposed between the temporarily inflatable bladder and the pump, wherein:
the first check valve is disposed along a first pneumatic passage extending between the temporarily inflatable bladder and the pump,
the second check valve is disposed along a second pneumatic passage extending between the temporarily inflatable bladder and the pump; and
the first and second pneumatic passages extend parallel to each other.

17. A patient support system comprising:
a patient support comprising:
a resilient support layer for supporting a patient; and
a temporarily inflatable bladder disposed underneath part of the resilient support layer, the temporarily inflatable bladder being distanced from a head end and a foot end of the resilient support layer and positioned such that, in use, the temporarily inflatable bladder is aligned, in a longitudinal direction of the patient support, with a back and/or a pelvic region of the patient; and
an air supply module exterior to the patient support and operatively connected to the patient support, the air supply module comprising:
a pump operable to selectively inflate the temporarily inflatable bladder to limit immersion of the back and/or pelvic region of the patient into the resilient support layer;
a user-actuated control for selectively activating a bladder inflation mode in which the temporarily inflatable bladder is inflated; and
a controller in communication with the pump, the controller being responsive to a user input at the user-actuated control,
the controller being configured to deactivate the pump in response to a pressurization time associated with the temporarily inflatable bladder being equal to or greater than a threshold pressurization time.

18. A method for controlling a patient support, the patient support comprising a resilient support layer for supporting a patient and a temporarily inflatable bladder disposed underneath the resilient support layer, the method comprising:
receiving an activation signal indicative of a user's desire to activate a bladder inflation mode;
in response to receiving the activation signal, inflating the temporarily inflatable bladder to temporarily limit an immersion of a back and/or pelvic region of the patient into the resilient support layer;
counting a pressurization time associated with the temporarily inflatable bladder; and
in response to the pressurization time associated with the inflatable bladder reaching a threshold pressurization time, deactivating the bladder inflation mode to allow the inflatable bladder to deflate and stop limiting the immersion of the patient into the resilient support layer.

19. The method of claim 18, wherein said counting the pressurization time begins in response to the pressure associated with the pneumatic system reaching the operating pressure of the temporarily inflatable bladder.

* * * * *